United States Patent
Yamagami et al.

(10) Patent No.: US 12,470,029 B2
(45) Date of Patent: *Nov. 11, 2025

(54) ROTARY CONNECTOR DEVICE

(71) Applicants: FURUKAWA ELECTRIC CO., LTD., Tokyo (JP); FURUKAWA AUTOMOTIVE SYSTEMS INC., Inukami-gun (JP)

(72) Inventors: Yohei Yamagami, Inukami-gun (JP); Shinichi Hamasaki, Inukami-gun (JP); Masaya Araki, Inukami-gun (JP); Hirofumi Utsunomiya, Inukami-gun (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 525 days.

This patent is subject to a terminal disclaimer.

(21) Appl. No.: 18/096,498

(22) Filed: Jan. 12, 2023

(65) Prior Publication Data

US 2023/0170657 A1 Jun. 1, 2023

Related U.S. Application Data

(63) Continuation of application No. PCT/JP2021/026178, filed on Jul. 12, 2021.

(30) Foreign Application Priority Data

Jul. 15, 2020 (JP) ................................. 2020-121326
Nov. 26, 2020 (JP) ................................. 2020-196161

(51) Int. Cl.
*H01R 35/00* (2006.01)
*B60R 16/027* (2006.01)
(Continued)

(52) U.S. Cl.
CPC ......... *H01R 35/025* (2013.01); *B60R 16/027* (2013.01); *B62D 1/10* (2013.01); *H01R 2201/26* (2013.01)

(58) Field of Classification Search
CPC ........ H01R 35/04; H01R 43/00; B06R 16/027
See application file for complete search history.

(56) References Cited

U.S. PATENT DOCUMENTS 6,572,393 B2 * 6/2003 Kawamura ........... B60R 16/027
439/164
6,644,978 B2 * 11/2003 Araki ................... H01R 35/025
439/15
(Continued)

FOREIGN PATENT DOCUMENTS

DE 4014485 C2 11/1991
GB 2250146 B 5/1992
(Continued)

OTHER PUBLICATIONS

International Search Report for corresponding International Application No. PCT/JP2021/026178, Sep. 14, 2021.
(Continued)

*Primary Examiner* — Phuong Chi Thi Nguyen
(74) *Attorney, Agent, or Firm* — Mori & Ward, LLP

(57) ABSTRACT

A rotary connector device includes a first case, a second case, and a stopper structure. The stopper structure includes a movable member, a movement conversion portion, and a stopper. The movable member is rotatable about a rotation axis along with the second case with respect to the first case. The movable member is movable in an axial direction defined along the rotation axis with respect to the first case and the second case. The movement conversion portion is to convert a relative rotation of the first case and the second case into a movement of the movable member in the axial direction with respect to the first case and the second case.

(Continued)

The stopper is provided on at least one of the first case and the second case. The stopper is contactable with the movable member.

29 Claims, 16 Drawing Sheets

(51) Int. Cl.
*H01R 35/02* (2006.01)
*B62D 1/10* (2006.01)

(56) References Cited

U.S. PATENT DOCUMENTS

| | | | |
|---|---|---|---|
| 11,749,942 B2* | 9/2023 | Yang | H01R 13/502 |
| | | | 439/39 |
| 11,909,149 B2* | 2/2024 | Kitao | H02G 11/02 |
| 12,334,695 B2 | 6/2025 | Araki et al. | |
| 2008/0014775 A1 | 1/2008 | Yoshimura et al. | |
| 2008/0113506 A1* | 5/2008 | Ohtsuka | H01L 21/76873 |
| | | | 438/653 |
| 2009/0158585 A1* | 6/2009 | Yajima | H01R 35/025 |
| | | | 29/874 |

FOREIGN PATENT DOCUMENTS

| | | |
|---|---|---|
| JP | 01-2583 77 | 10/1989 |
| JP | 2002-218639 | 8/2002 |
| JP | 2007-320450 | 12/2007 |
| JP | 2008-30713 | 2/2008 |
| JP | 2014-032762 | 2/2014 |
| JP | 2014-238970 | 12/2014 |
| JP | 2016-074334 | 5/2016 |
| JP | 2018-045787 | 3/2018 |
| JP | 2019-016497 | 1/2019 |
| WO | WO 2008/046506 | 4/2008 |

OTHER PUBLICATIONS

Written Opinion for corresponding International Application No. PCT/JP2021/026178, Jan. 26, 2023.
Japanese Office Action for corresponding JP Application No. 2022-536352, Jul. 30, 2024 (w/ English machine translation).
Korean Office Action for corresponding KR Application Nb. 10-2023-7004592, May 12, 2025 (w/ English machine translation).
Extended European Search Report for corresponding EP Application No. 21841665.9-1009, Nov. 9, 2023.

\* cited by examiner

ROTARY CONNECTOR DEVICE

CROSS-REFERENCE TO RELATED APPLICATIONS

The present application is a continuation application of International Application No. PCT/JP2021/026178, filed Jul. 12, 2021, which claims priority to Japanese Patent Applications No. 2020-121326 filed Jul. 15, 2020 and No. 2020-196161 filed Nov. 26, 2020. The contents of these applications are incorporated herein by reference in their entirety.

BACKGROUND

Technical Field

The technique disclosed herein relates to a rotary connector device.

Background Art

For example, a rotary connector device includes a stationary member, a rotary member, and an electrical cable. When the rotary connector device is attached to a vehicle body, the stationary member is secured to the vehicle body, and a steering is coupled to the rotary member. A housing space in which the electrical cable is disposed is formed between the stationary member and the rotary member. The electrical cable is circumferentially wound in the housing space, and electrically connects an electronic component provided in the vehicle body and an electronic component provided in the steering while the rotation of the rotary member with respect to the stationary member is permitted in a predetermined range (see, for example, Japanese Unexamined Patent Publication JP 2002-218639 A).

The rotary connector device has a neutral rotation position at which rotation angles of the rotary member with respect to the stationary member are equal clockwise and counter-clockwise. When the rotary connector device is attached to the vehicle body, the rotary connector device is preferably attached at the neutral rotation position.

Therefore, a viewing window for confirming a neutral rotation position of a rotary connector device has been proposed (see, for example, Japanese Unexamined Patent Publication JP 2014-032762 A). In this rotary connector device, a position of an electrical cable is confirmed from the viewing window to determine whether a rotary member is at the neutral rotation position.

SUMMARY

According to one aspect, a rotary connector device includes a first case, a second case, and a stopper structure. The first case and the second case are rotatably provided relative to each other about a rotation axis. The first case and the second case define a cable housing space provided to surround the rotation axis. The stopper structure is to restrict a relative rotation of the first case and the second case within a predetermined rotation angle. The stopper structure includes a movable member, a movement conversion portion, and a stopper. The movable member is rotatable about the rotation axis along with the second case with respect to the first case. The movable member is movable in an axial direction defined along the rotation axis with respect to the first case and the second case. The movement conversion portion is to convert the relative rotation of the first case and the second case into a movement of the movable member in the axial direction with respect to the first case and the second case. The stopper is provided on at least one of the first case and the second case. The stopper is contactable with the movable member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
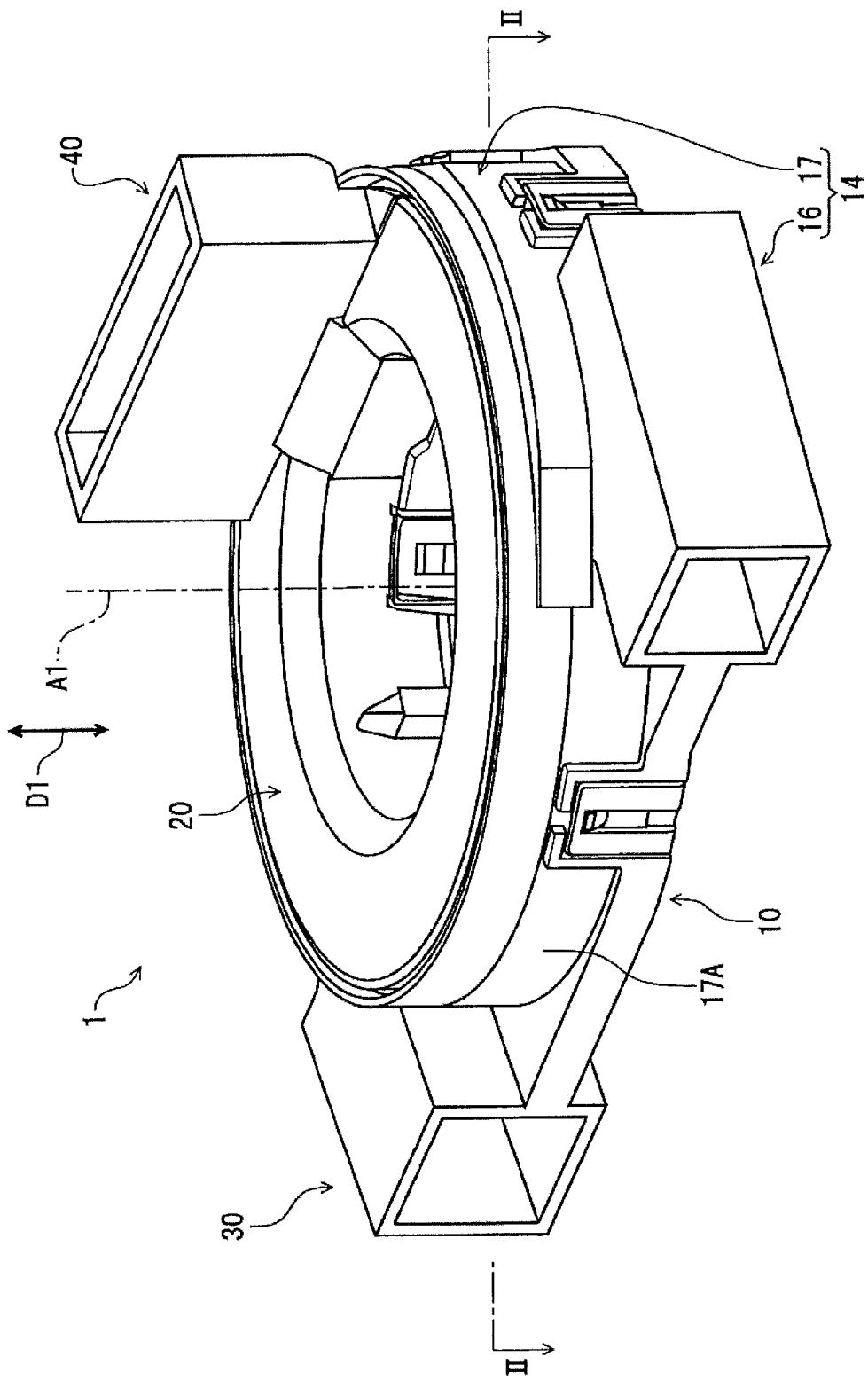
FIG. 1 is a perspective view of a rotary connector device according to an embodiment.

Embodiments will be described below with reference to the drawings. In the drawings, the same reference signs indicate corresponding or identical configurations.

As illustrated in FIG. 1, a rotary connector device 1 includes a first case 10 and a second case 20. The first case 10 and the second case 20 are rotatably provided relative to each other about a rotation axis A1. In the present embodiment, for example, the first case 10 is secured to a vehicle body. The second case 20 rotates along with a steering wheel. That is, the first case 10 is a stator to be secured to the vehicle body. The second case 20 is a rotor rotatable about the rotation axis A1 with respect to the stator. That is, the first case 10 may be referred to as the stator 10. The second case 20 may be referred to as the rotor 20. However, the first case 10 may be a rotor, and the second case 20 may be a stator. In other words, in the present application, the configuration provided in the stator 10 may be provided in the rotor 20, and the configuration provided in the rotor 20 may be provided in the stator 10.

The rotary connector device 1 includes a first electrical connector 30 and a second electrical connector 40. The first electrical connector 30 is attached to the first case 10. The second electrical connector 40 is attached to the second case 20. The first electrical connector 30 is electrically connected to, for example, an electrical device (for example, a control device and a battery) provided on the vehicle body. The second electrical connector 40 is electrically connected to electric circuits of, for example, switches of a steering wheel and an airbag device.

Figure 2:
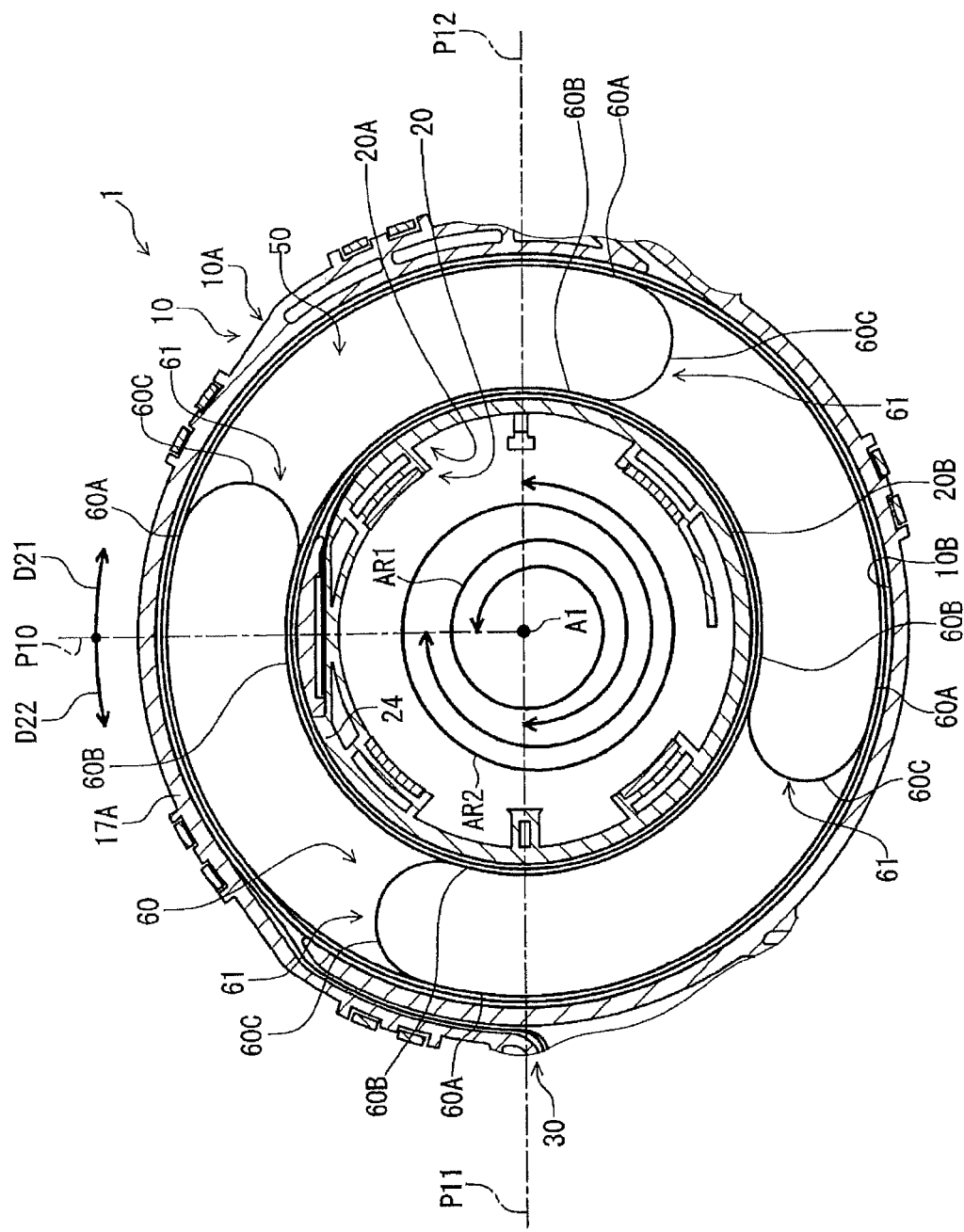
FIG. 2 is a cross-sectional view of the rotary connector device taken along line II-II of FIG. 1.

As illustrated in FIG. 2, the first case 10 and the second case 20 define a cable housing space 50 provided to surround the rotation axis A1. For example, the cable housing space 50 has an annular shape and extends in a circumferential direction D3 with respect to the rotation axis A1. The rotary connector device 1 further includes an electrical cable 60 provided in the cable housing space 50. The electrical cable 60 is electrically connected to the first electrical connector 30 and the second electrical connector 40 (FIG. 1). The electrical cable 60 is flexible and has a flat shape. The electrical cable 60 may also be referred to as a flexible flat cable. In the present embodiment, the electrical cable 60 includes a plurality of flat cables 61.

The first case 10 includes an inner peripheral surface 10B that partially defines the cable housing space 50. The second case 20 includes an outer peripheral surface 20B provided radially inwardly of the inner peripheral surface 10B and partially defining the cable housing space 50. The electrical cable 60 includes a first winding portion 60A, a second winding portion 60B, and a reversing portion 60C. The first winding portion 60A is wound along the inner peripheral surface 10B of the first case 10. The second winding portion 60B is wound along the outer peripheral surface 20B of the second case 20. The reversing portion 60C is provided between the first winding portion 60A and the second winding portion 60B to couple the first winding portion 60A to the second winding portion 60B.

The first winding portion 60A is electrically connected to the first electrical connector 30. The second winding portion 60B is electrically connected to the second electrical connector 40 (FIG. 1). The reversing portion 60C bends between the first winding portion 60A and the second winding portion 60B. The reversing portion 60C has, for example, a curved shape protruding in a first rotation direction D21. Each of the plurality of flat cables 61 includes the first winding portion 60A, the second winding portion 60B, and the reversing portion 60C.

The electrical cable 60 is provided in the cable housing space 50 such that the length of the second winding portion 60B of the electrical cable 60 wound about the outer peripheral surface 20B decreases when the second case 20 rotates in the first rotation direction D21 with respect to the first case 10. The electrical cable 60 is provided in the cable housing space 50 such that the length of the second winding portion 60B of the electrical cable 60 wound about the outer peripheral surface 20B increases when the second case 20 rotates with respect to the first case 10 in a second rotation direction D22 opposite to the first rotation direction D21. In other words, the electrical cable 60 is provided in the cable housing space 50 such that the length of the first winding portion 60A of the electrical cable 60 wound about the inner peripheral surface 10B increases when the second case 20 rotates in the first rotation direction D21 with respect to the first case 10. The electrical cable 60 is provided in the cable housing space 50 such that the length of the first winding portion 60A of the electrical cable 60 wound about the inner peripheral surface 10B decreases when the second case 20 rotates in the second rotation direction D22 with respect to the first case 10.

However, when the first case 10 and the second case 20 excessively rotate relatively, for example, the electrical cable 60 becomes loose and the state of the reversing portion 60C of the electrical cable 60 possibly deteriorates.

Figure 3:
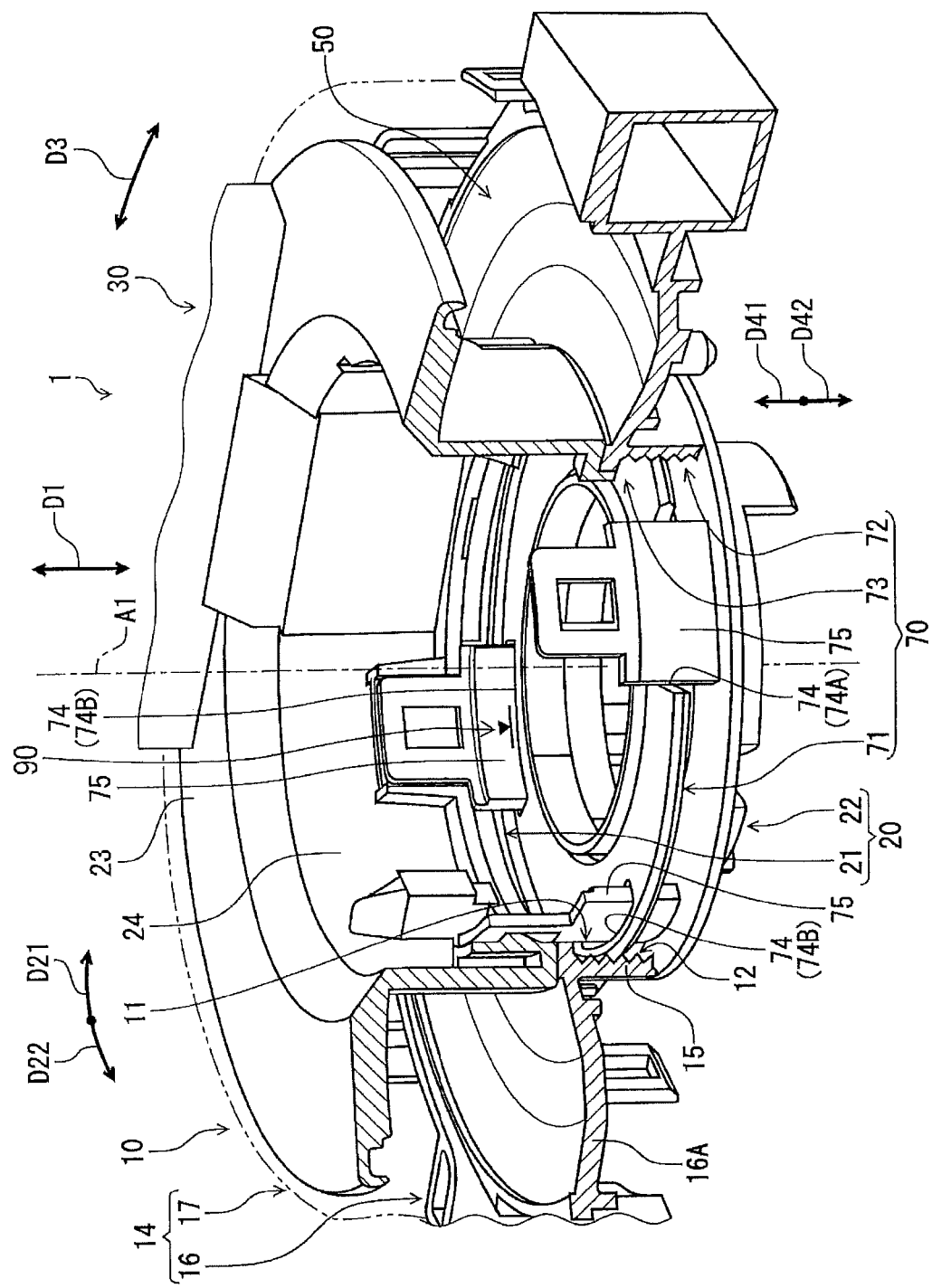
FIG. 3 is a partial cross-sectional perspective view of the rotary connector device illustrated in FIG. 1.

Thus, as illustrated in FIG. 3, the rotary connector device 1 includes a stopper structure 70 that restricts the relative rotation of the first case 10 and the second case 20 within a predetermined rotation angle. The stopper structure 70 includes a movable member 71, a movement conversion portion 72, and a stopper 73. That is, the rotary connector device 1 includes the movable member 71, the movement conversion portion 72, and the stopper 73.

The movable member 71 is rotatable about the rotation axis A1 along with the second case 20 with respect to the first case 10. The movable member 71 is movable with respect to the first case 10 and the second case 20 in an axial direction D1 defined along the rotation axis A1. The movement conversion portion 72 converts the relative rotation of the first case 10 and the second case 20 into movement of the movable member 71 with respect to the first case 10 and the second case 20 in the axial direction D1. The stopper 73 is provided on at least one of the first case 10 and the second case 20. The stopper 73 restricts the relative rotation of the first case 10 and the second case 20 within the predetermined rotation angle. The stopper 73 is contactable with the movable member 71. In the present embodiment, the stopper 73 is provided on the first case 10. The stopper 73 is contactable with the movable member 71 in the axial direction D1. The stopper 73 is provided at least on the stator 10. The stopper 73 is provided on the stator 10. However, the stopper 73 may be provided only on the second case 20 or may be provided on both of the first case 10 and the second case 20. Alternatively, the stopper 73 may be omitted from the rotary connector device 1.

The movement conversion portion 72 is rotatable about the rotation axis A1 along with the first case 10 with respect to the second case 20 and the movable member 71. That is, the second case 20 and the movable member 71 are rotatable about the rotation axis A1 with respect to the first case 10 and the movement conversion portion 72.

The movement conversion portion 72 is provided radially outwardly of the movable member 71. The first case 10 includes a center opening 11 extending in the axial direction D1. At least one of the movable member 71, the movement conversion portion 72, and the stopper 73 is at least partially provided in the center opening 11.

In the present embodiment, the movable member 71, the movement conversion portion 72, and the stopper 73 are provided in the center opening 11. However, at least one of the movable member 71, the movement conversion portion 72, and the stopper 73 may be partially provided in the center opening 11. At least one of the movable member 71, the movement conversion portion 72, and the stopper 73 may be provided outside the center opening 11. The movement conversion portion 72 may be provided radially inwardly of the movable member 71.

The first case 10 includes an inner peripheral portion 12 that at least partially defines the center opening 11. The movement conversion portion 72 is provided on the inner peripheral portion 12 of the first case 10. The first case 10 includes a first case body 14 and a cylindrical portion 15. The first case body 14 has an annular shape, and partially defines the cable housing space 50. The cylindrical portion 15 extends from the first case body 14 in the axial direction D1 and includes the inner peripheral portion 12.

As illustrated in FIG. 1, the first case body 14 includes a first annular body 16 and a second annular body 17. The second annular body 17 is a separate member from the first annular body 16 and is coupled to the first annular body 16. The first annular body 16 includes a first annular plate 16A. The second annular body 17 includes an outer peripheral wall 17A (FIG. 1). The cylindrical portion 15 extends from the inner periphery of the first annular plate 16A in the axial direction D1.

The second case 20 includes a second case body 21 and a sleeve 22. The second case body 21 has an annular shape and partially defines the cable housing space 50. The sleeve 22 is a separate member from the second case body 21 and is coupled to the second case body 21. The movable member 71 is coupled to the sleeve 22 to be movable in the axial direction D1. The second case body 21 includes a second annular plate 23 and an inner peripheral wall 24. The inner peripheral wall 24 extends from the second annular plate 23 in the axial direction D1.

At least one of the second case 20 and the movable member 71 includes at least one guide opening 74. At least one of the second case 20 and the movable member 71 includes at least one guide protruding portion 75 extending in the axial direction D1. At least one guide protruding portion 75 is provided in the at least one guide opening 74. The at least one guide opening 74 includes a plurality of guide openings 74 disposed spaced apart in the circumferential direction D3 about the rotation axis A1. The at least one guide protruding portion 75 includes the respective plurality of guide protruding portions 75 disposed spaced apart in the circumferential direction D3 and provided in the plurality of guide openings 74.

Figure 4:
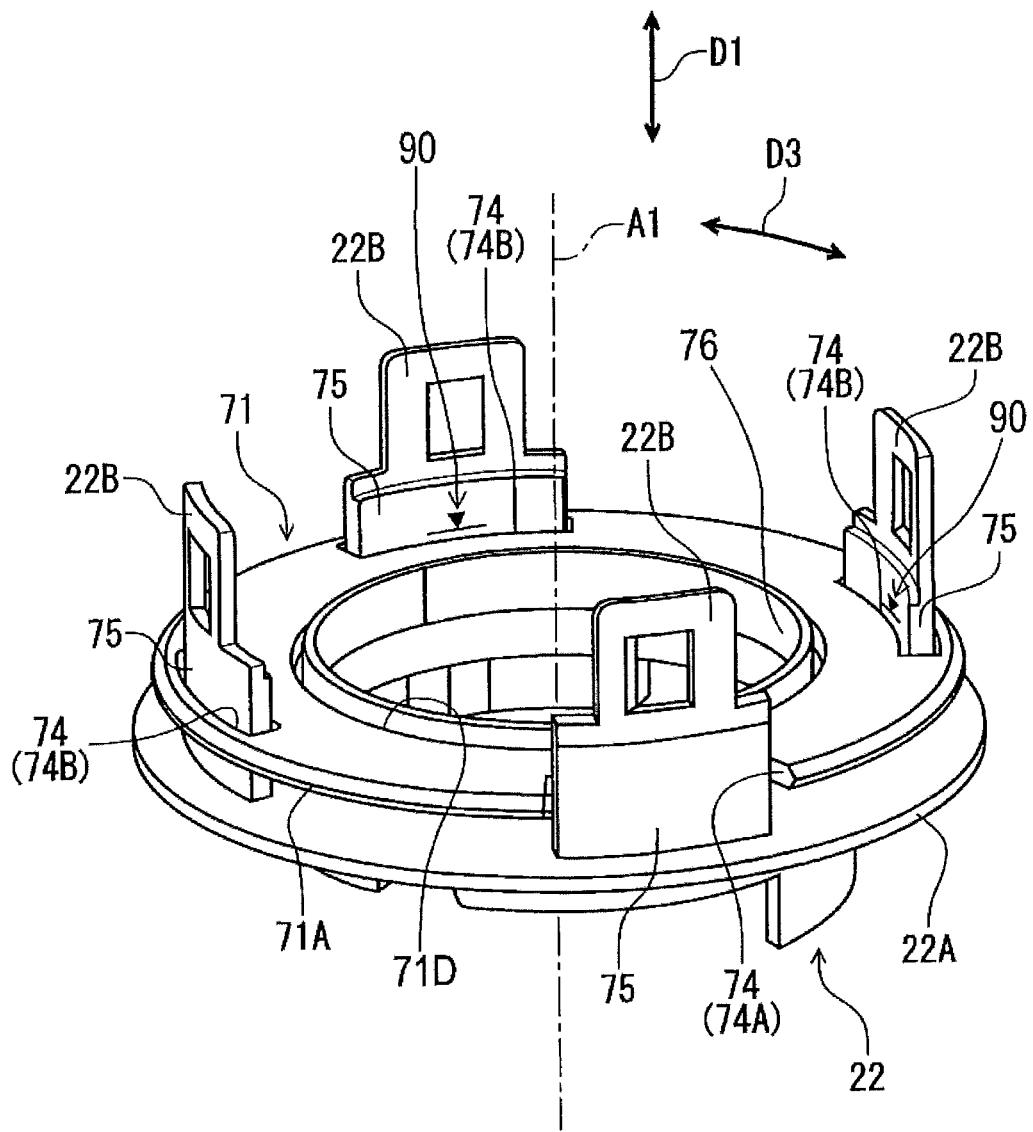
FIG. 4 is a perspective view of a sleeve and a movable member of the rotary connector device illustrated in FIG. 1.

As illustrated in FIG. 4, the sleeve 22 includes a sleeve body 22A and the at least one guide protruding portion 75 protruding from the sleeve body 22A in the axial direction D1. The movable member 71 includes the at least one guide opening 74. In the present embodiment, the sleeve body 22A has an annular shape. The second case 20 includes the plurality of guide protruding portions 75 protruding from the sleeve body 22A in the axial direction D1. The movable member 71 includes the plurality of guide openings 74. However, the second case 20 (FIG. 3) may include the at least one guide opening 74. The movable member 71 may include the at least one guide protruding portion 75.

The movable member 71 has an annular shape. The movable member 71 includes an outer peripheral portion 71A. The plurality of guide openings 74 includes a notch 74A and a plurality of guide holes 74B. The plurality of guide protruding portions 75 are disposed on the notch 74A and in the plurality of guide holes 74B. The plurality of guide openings 74 may include only the notch 74A or only the guide hole 74B.

The sleeve 22 includes at least one sleeve coupling portion 22B. The at least one sleeve coupling portion 22B couples the sleeve body 22A to the second case body 21. The at least one sleeve coupling portion 22B protrudes from the at least one guide protruding portion 75 in the axial direction D1. In the present embodiment, the sleeve 22 includes a plurality of the sleeve coupling portions 22B protruding in the axial direction D1 from the plurality of guide protruding portions 75. However, the sleeve coupling portion 22B may be disposed at a position different from the guide protruding portion 75.

The sleeve 22 includes an axial protruding portion 76. The axial protruding portion 76 protrudes from the sleeve body 22A in the axial direction D1. The axial protruding portion 76 is disposed radially inwardly of the plurality of guide protruding portions 75. The axial protruding portion 76 has an annular shape. The movable member 71 includes an opening 71D. The outer diameter of the axial protruding portion 76 is smaller than the inner diameter of the opening 71D.

Figure 5:
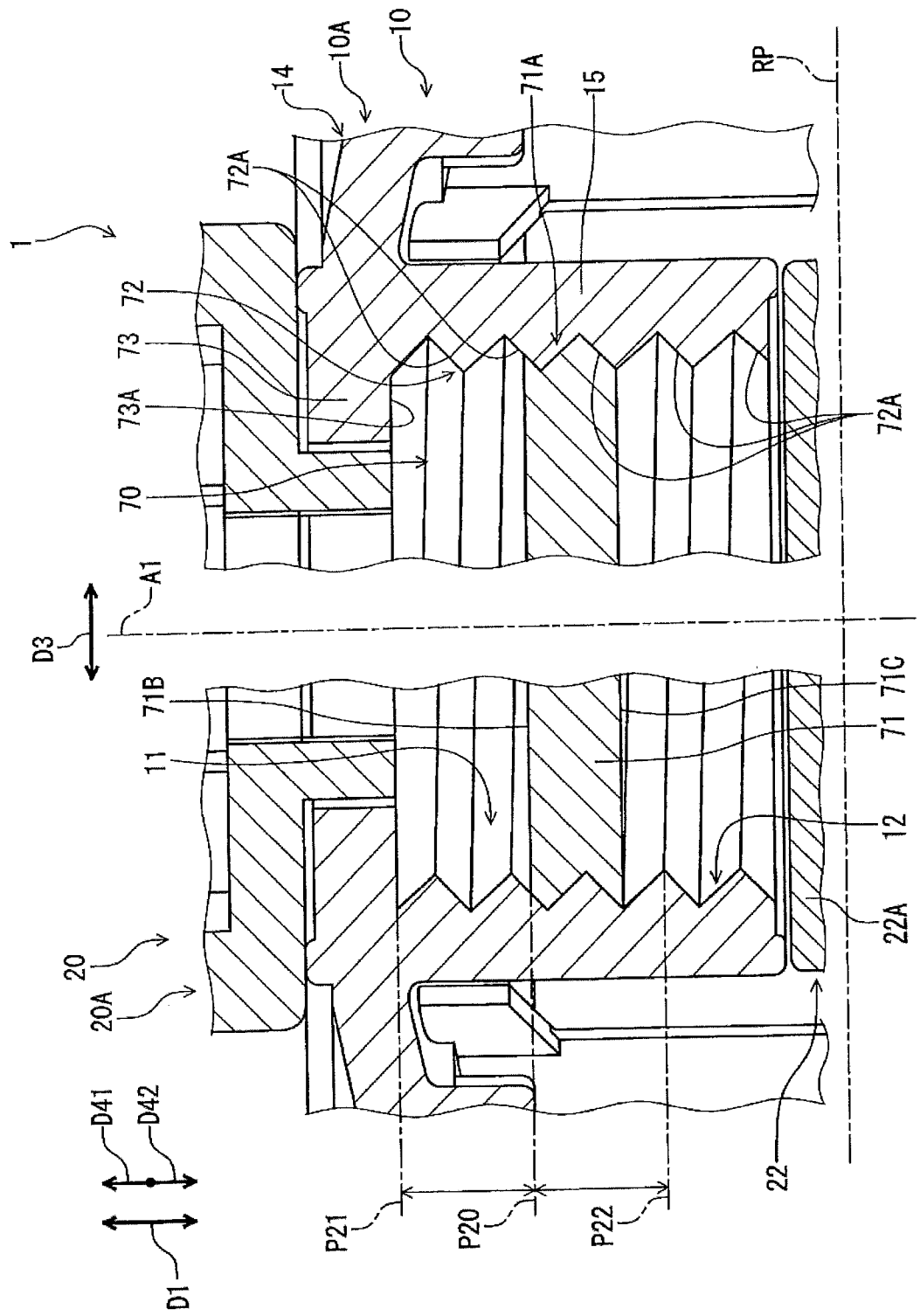
FIG. 5 is a partial cross-sectional view of the rotary connector device illustrated in FIG. 1.

As illustrated in FIG. 5, the movement conversion portion 72 includes a conversion groove 72A. The conversion groove 72A converts the relative rotation of the first case 10 and the second case 20 into the movement of the movable member 71 in the axial direction D1. The outer peripheral portion 71A of the movable member 71 is disposed in the conversion groove 72A.

The conversion groove 72A extends in the circumferential direction D3 about the rotation axis A1. The conversion groove 72A is inclined with respect to a reference plane RP perpendicular to the rotation axis A1. The conversion groove 72A extends helically about the rotation axis A1. In the embodiment, the movement conversion portion 72 includes a female thread including one helical conversion groove 72A. For example, the conversion groove 72A constitutes the female thread having a thread diameter of M55 and a pitch of 1.5 mm. However, the dimensions of the female thread are not limited to the dimensions described above. The conversion groove 72A may be provided intermittently in the circumferential direction D3.

The outer peripheral portion 71A of the movable member 71 includes a male thread. The male thread of the outer peripheral portion 71A is threaded into the female thread configured by the conversion groove 72A. In the present embodiment, the thickness of the movable member 71 in the axial direction D1 is equivalent to 1.25 times of the width of the conversion groove 72A in the axial direction D1. However, the thickness of the movable member 71 is not limited to the above-described dimensions.

Note that, as described later, in a modification in which the movement conversion portion 72 is disposed radially inwardly of the movable member 71, for example, the second case 20 or the movable member 71 includes a female thread, and the movement conversion portion 72 includes a male thread. In such a modification, for example, the movement conversion portion 72 is provided on the sleeve 22, and the movable member 71 is rotatable along with the first case 10 and movable in the axial direction D1 with respect to the first case 10.

The stopper 73 includes a stopper surface 73A facing the axial direction D1. The stopper surface 73A extends in the circumferential direction D3 about the rotation axis A1. The stopper 73 protrudes radially inward from the first case 10. The stopper 73 protrudes radially inward from the cylindrical portion 15 of the first case 10. In the present embodiment, the stopper 73 and the stopper surface 73A have annular shapes. However, the shapes of the stopper 73 and the stopper surface 73A are not limited to the annular shapes.

The movable member 71 includes a first surface 71B facing the axial direction D1 and a second surface 71C provided on the back side of the first surface 71B in the axial direction D1. The first surface 71B is disposed to face the stopper surface 73A. The first surface 71B is contactable with the stopper surface 73A. The second surface 71C is disposed to face the sleeve body 22A.

As illustrated in FIG. 3, when the second case 20 rotates in one of the first rotation direction D21 and the second rotation direction D22 with respect to the first case 10, the movement conversion portion 72 moves the movable member 71 toward the stopper 73 in a first moving direction D41. The movement conversion portion 72 moves the movable member 71 in a second moving direction D42 opposite to the first moving direction D41 when the second case 20 rotates in the other of the first rotation direction D21 and the second rotation direction D22 with respect to the first case 10. In other words, the movement conversion portion 72 moves the movable member 71 toward the sleeve body 22A when the second case 20 rotates in the other of the first rotation direction D21 and the second rotation direction D22 with respect to the first case 10. The second direction D22 is the direction opposite to the first direction D21.

In the present embodiment, when the second case 20 rotates in the first rotation direction D21 with respect to the first case 10, the movement conversion portion 72 moves the movable member 71 toward the stopper 73 in the first moving direction D41. The movement conversion portion 72 moves the movable member 71 in the second moving direction D42 when the second case 20 rotates in the second rotation direction D22 with respect to the first case 10. However, the movement conversion portion 72 may move the movable member 71 in the second moving direction D42 when the second case 20 rotates in the first rotation direction D21 with respect to the first case 10. The movement conversion portion 72 may move the movable member 71 in the first moving direction D41 when the second case 20 rotates in the second rotation direction D22 with respect to the first case 10.

As illustrated in FIG. 2, the first case 10 and the second case 20 have a neutral rotation position P10 corresponding to a neutral position of steering. A predetermined rotation angle of the stopper structure 70 is defined between a first relative rotation position P11 and a second relative rotation position P12. For example, in a state where the movable member 71 contacts the stopper 73, the first case 10 and the second case 20 are disposed at the first relative rotation position P11. The second case 20 is rotatable with respect to the first case 10 by the first rotation angle in the first rotation direction D21 from the neutral rotation position P10 and is rotatable by the second rotation angle in the second rotation direction D22. The first rotation angle is substantially equal to the second rotation angle.

Specifically, as illustrated in FIG. 2 and FIG. 5, when the second case 20 rotates from the neutral rotation position P10 in the first rotation direction D21 with respect to the first case 10, the movable member 71 moves from a neutral position P20 in the first moving direction D41 toward the stopper 73. When the movable member 71 contacts the stopper 73, the movable member 71 stops at a first stopper position P21, and the second case 20 stops at the first relative rotation position P11. In the present embodiment, the neutral position P20 to the first stopper position P21 is equivalent to 1.75 times of the width of the conversion groove 72A in the axial direction D1. Thus, the first rotation angle from the neutral rotation position P10 to the first relative rotation position P11 is 630 degrees (see, e.g., an arrow AR1 in FIG. 2). In other words, the movement conversion portion 72 converts the relative rotation of the first case 10 and the second case 20 into the movement of the movable member 71 in the axial direction D1 such that the movement distance of the movable member 71 in the axial direction D1 with respect to the first case 10 and the second case 20 is proportional to the relative rotation angle of the first case 10 and the second case 20.

On the other hand, when the second case 20 rotates from the neutral rotation position P10 in the second rotation direction D22 with respect to the first case 10, the movable member 71 moves from the neutral position P20 to the second moving direction D42. As a result, at least one of the plurality of reversing portions 60C of the electrical cable 60 is fully extended, and the electrical cable 60 is pulled between the first case 10 and the second case 20. Consequently, the second case 20 stops at the second relative rotation position P12 with respect to the first case 10. In the present embodiment, the second rotation angle from the neutral rotation position P10 to the second relative rotation position P12 is set to the same angle as the first rotation angle from the neutral rotation position P10 to the first relative rotation position P11 (see, for example, the arrow AR2 in FIG. 2). Thus, the movable member 71 moves in the second moving direction D42 by the distance 1.75 times of the width of the conversion groove 72A in the axial direction D1 but stops at a second stopper position P22 without contacting the sleeve body 22A.

Figure 6:
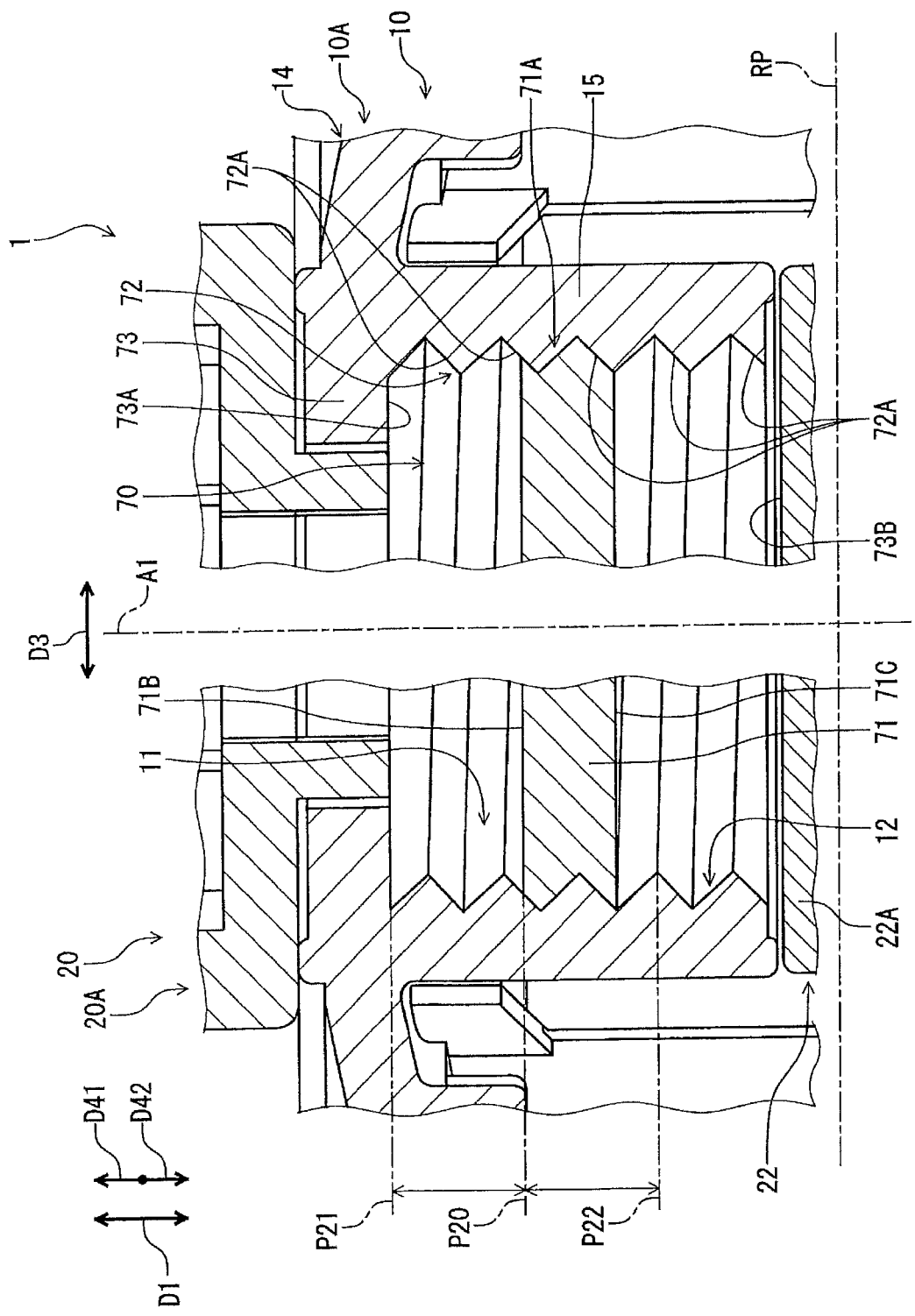
FIG. 6 is a partial cross-sectional view of a rotary connector device according to a modification.

However, by bringing the movable member 71 into contact with at least one of the first case 10 and the second case 20, the second relative rotation position P12 may be defined. For example, the movable member 71 may be brought into contact with the sleeve body 22A before the electrical cable 60 is pulled between the first case 10 and the second case 20, and thus the second relative rotation position P12 may be defined. For example, as illustrated in FIG. 6, instead of providing the stopper surface 73A of the stopper 73 on the first case 10, or in addition to providing the stopper surface 73A of the stopper 73 on the first case 10, a stopper surface 73B may be provided on the sleeve 22 as the stopper 73. Additionally, the predetermined rotation angle of the stopper structure 70 is 1260 degrees, but the predetermined rotation angle may be other angles. The rotation angle from the neutral rotation position P10 to the second relative rotation position P12 may be set at an angle different from the rotation angle from the neutral rotation position P10 to the first relative rotation position P11.

Figure 7:
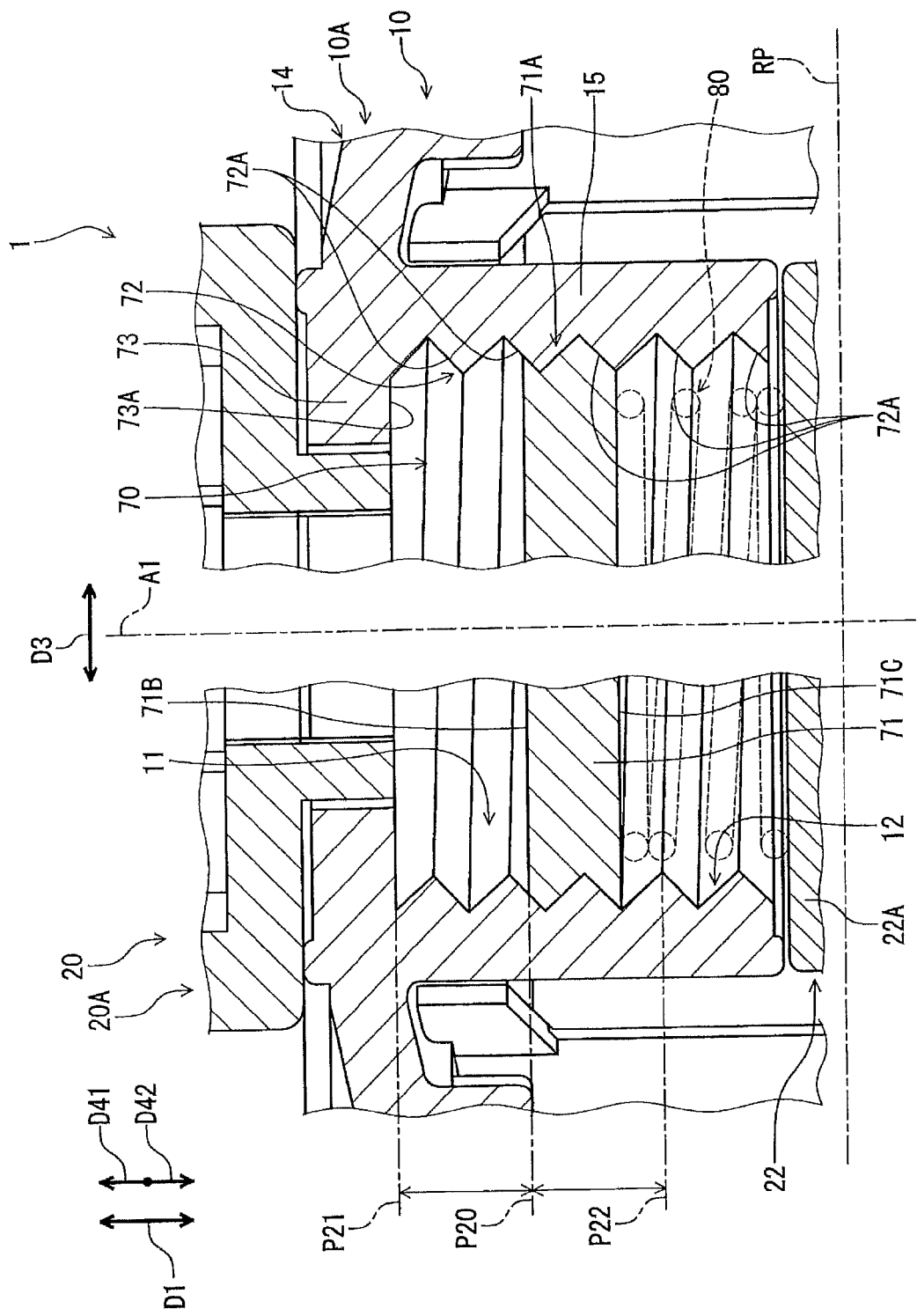
FIG. 7 is a partial cross-sectional view of a rotary connector device according to a modification.

Note that, as illustrated in FIG. 7, the rotary connector device 1 may further include biasing members 80 that bias the movable member 71 in the axial direction D1. For example, the biasing members 80 are disposed between the movable member 71 and the sleeve 22 in the axial direction D1. The biasing member 80 biases the movable member 71 toward the stopper 73. In the present modification, the biasing member 80 includes a coil spring. However, the biasing member 80 is not limited to the coil spring. In a state where the movable member 71 is not biased, the movable member 71 moves with respect to the movement conversion portion 72 by a gap generated between the male thread of the movable member 71 and the female thread of the movement conversion portion 72. As a result, the male thread of the movable member 71 contacts the female thread of the movement conversion portion 72, and a noise is generated. However, providing the biasing member 80 makes it possible to suppress the abnormal noise. Note that a space between the sleeve body 22A and the movable member 71 disposed at the neutral position P20 may be extended in the axial direction D1 in consideration of the height during compression of the biasing member 80.

Figure 8:
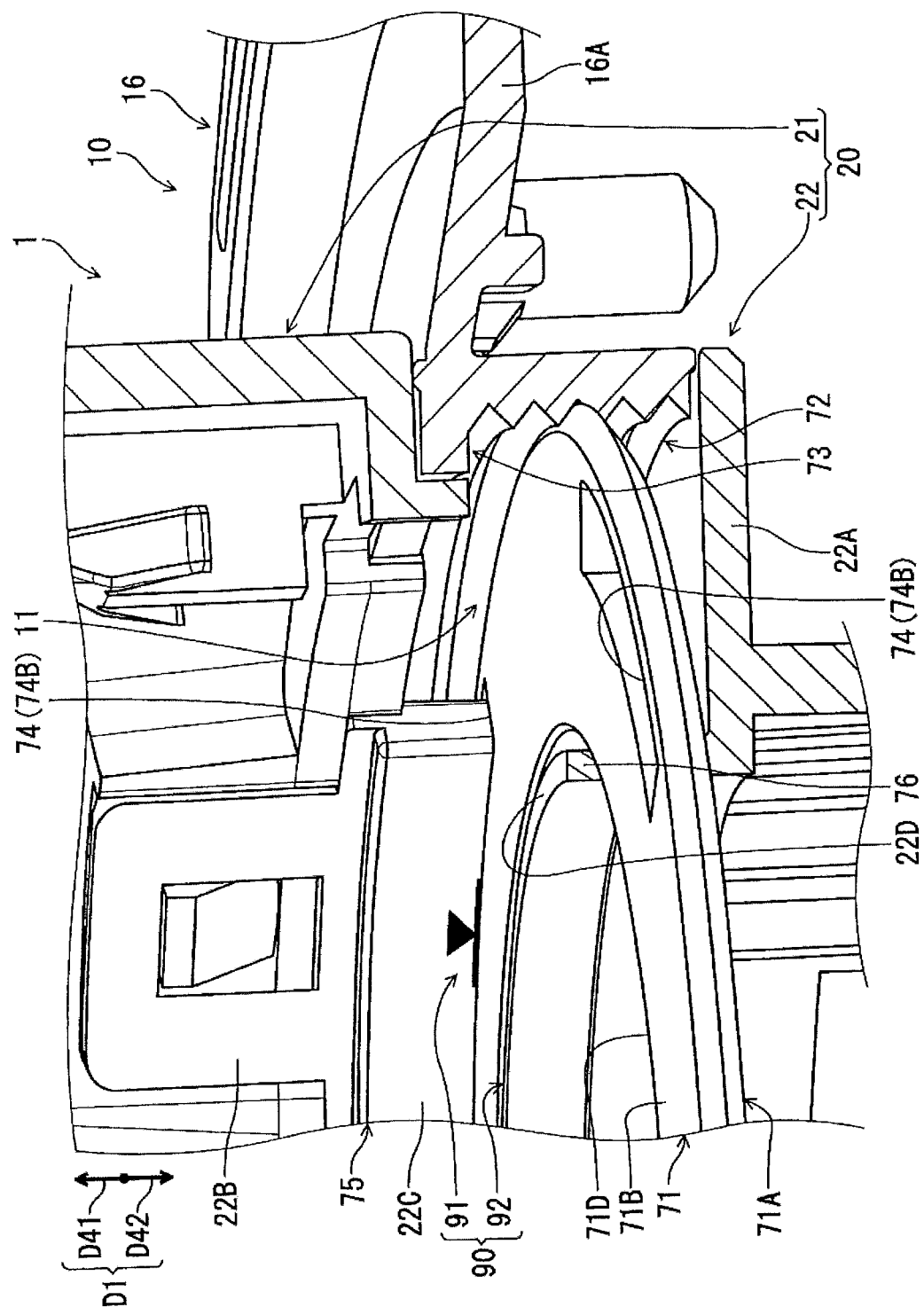
FIG. 8 is a partial cross-sectional perspective view of the rotary connector device illustrated in FIG. 1 (neutral rotation position).

As illustrated in FIG. 8, the rotary connector device 1 includes an indicator 90. The indicator 90 is provided on at least one of the first case 10 and the second case 20. The indicator 90 indicates that the second case 20 is disposed at the neutral rotation position P10 (see FIG. 2) with respect to the first case 10 by the positional relationship between the movable member 71 and the indicator 90 in the axial direction D1. With the movable member 71 disposed at the position indicated by the indicator 90, the second case 20 is disposed at the neutral rotation position P10 (see FIG. 2) with respect to the first case 10. With the movable member 71 disposed at the position indicated by the indicator 90, the movable member 71 is disposed at the neutral position P20 (see FIG. 5).

In the present embodiment, the indicator 90 is provided on the second case 20. The indicator 90 indicates such that the second case 20 is disposed at the neutral rotation position P10 with respect to the first case 10 by the positional relationship between the first surface 71B of the movable member 71 and the indicator 90. In a state where the first surface 71B of the movable member 71 is disposed at the position indicated by the indicator 90, the second case 20 is disposed at the neutral rotation position P10 with respect to the first case 10.

The indicator 90 is disposed radially inwardly of the movement conversion portion 72. The indicator 90 is provided on the sleeve 22. The sleeve 22 includes an inner surface 22C facing radially inward. In the present embodiment, the guide protruding portion 75 includes the inner surface 22C. However, the inner surface 22C may be provided on a portion other than the guide protruding portion 75. Additionally, as illustrated in FIG. 4, the rotary connector device 1 includes a plurality of the indicators 90 (e.g., four indicators 90), and the indicator 90 is provided on each of the guide protruding portions 75. However, the total number of the indicators 90 is not limited to the total number disclosed in the present embodiment.

At least one of the movable member 71, the movement conversion portion 72, and the indicator 90 is at least partially provided in the center opening 11. In the present embodiment, the movable member 71, the movement conversion portion 72, and the indicator 90 are provided in the center opening 11. However, at least one of the movable member 71, the movement conversion portion 72, and the indicator 90 may be provided at least partially outside the center opening 11.

The indicator 90 includes at least one of a mark 91 and a reference plane 92 provided on the sleeve 22. At least a part of the indicator 90 is provided on the inner surface 22C of the sleeve 22. The mark 91 of the indicator 90 is provided on the inner surface 22C of the sleeve 22. The reference plane 92 of the indicator 90 includes a first reference plane 22D provided on the sleeve 22 and substantially perpendicular to the axial direction D1. The first reference plane 22D is provided to face the axial direction D1. In the present embodiment, the first reference plane 22D is provided at the end portion of the axial protruding portion 76 of the sleeve 22.

Figure 9:
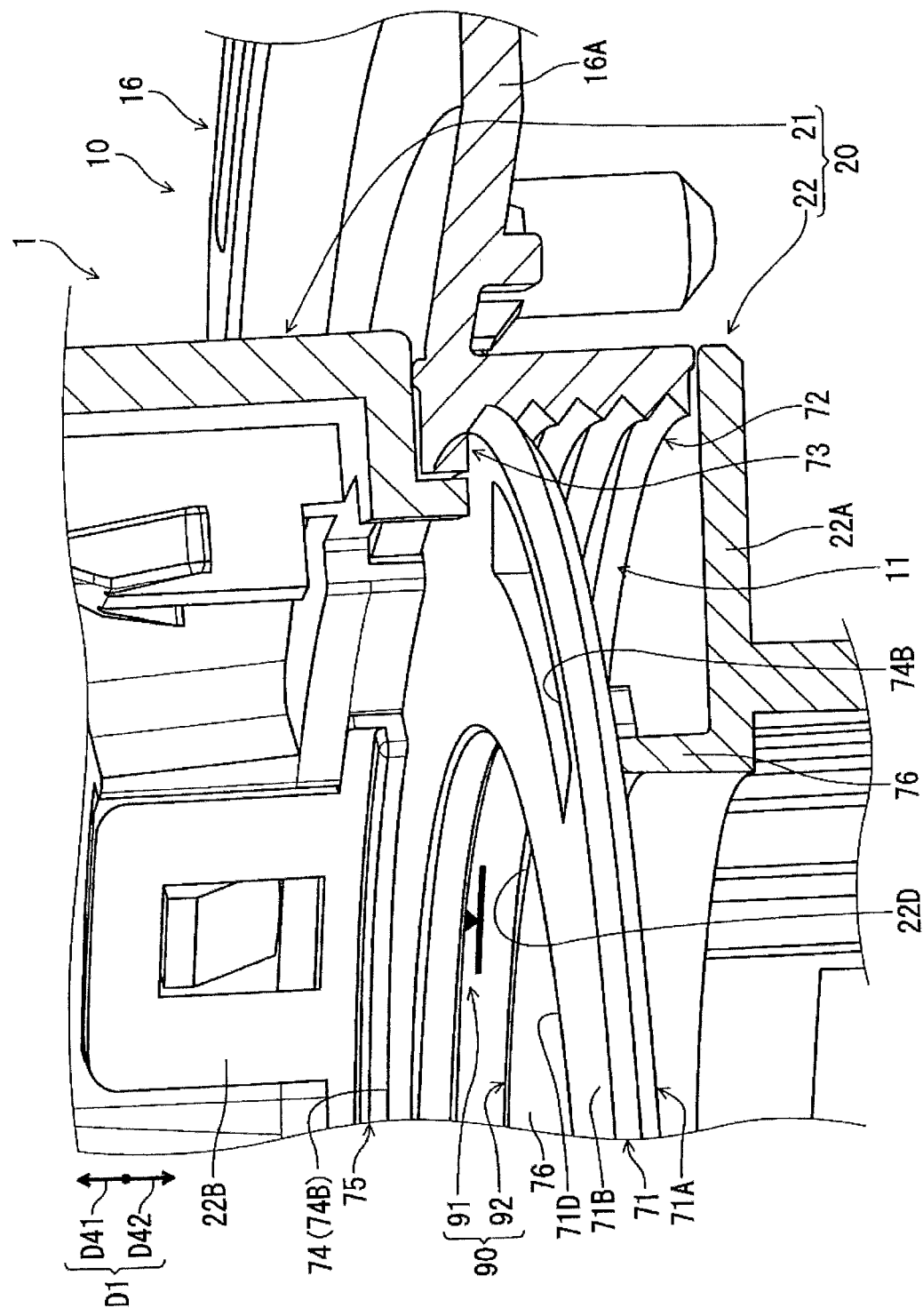
FIG. 9 is a partial cross-sectional perspective view of the rotary connector device illustrated in FIG. 1 (first relative rotation position).
Figure 10:
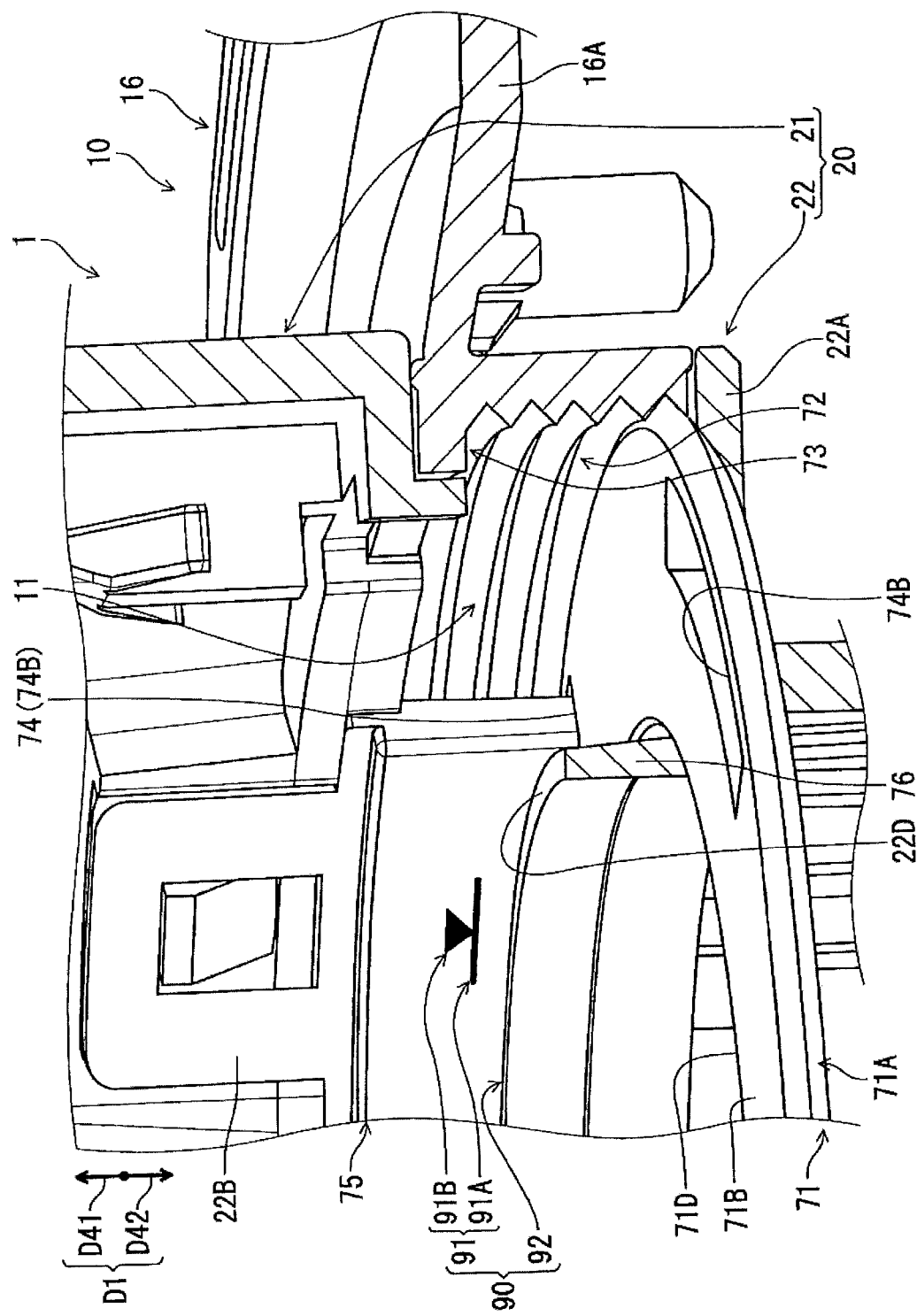
FIG. 10 is a partial cross-sectional perspective view of the rotary connector device illustrated in FIG. 1 (second relative rotation position).

As illustrated in FIG. 9, the neutral rotation position P10 is different from the rotation positions of the first case 10 and the second case 20 in a restricted state in which the relative rotation of the first case 10 and the second case 20 is restricted by the stopper 73. In the present embodiment, in the restricted state in which the relative rotation of the first case 10 and the second case 20 is restricted by the stopper 73, the movable member 71 is displaced from the indicator 90, which indicates the neutral rotation position P10, in the axial direction D1. In more detail, in the restricted state in which the relative rotation of the first case 10 and the second case 20 is restricted by the stopper 73, the movable member 71 is displaced from the indicator 90, which indicates the neutral rotation position P10, toward the stopper 73. As illustrated in FIG. 10, the mark 91 of the indicator 90 includes a line 91A and a graphic 91B. The line 91A is provided on the inner surface 22C of the sleeve 22 and extends in the circumferential direction D3. The graphic 91B includes, for example, a triangle, and is disposed adjacent to the line 91A.

As illustrated in FIG. 8, in a state where the first surface 71B of the movable member 71 coincides with the line 91A of the indicator 90, the second case 20 is disposed at the neutral rotation position P10 (see FIG. 2) with respect to the first case 10. The line 91A is drawn in a thick line such that the line 91A can be viewed in the state where the first surface 71B of the movable member 71 coincides with the line 91A. Additionally, the graphic 91B is disposed at a position viewed from the center opening 11 (see FIG. 3) in the state where the first surface 71B of the movable member 71 coincides with the line 91A.

Additionally, in a state where the first surface 71B of the movable member 71 coincides with the reference plane 92 (e.g., the first reference plane 22D) in the axial direction D1, the second case 20 is disposed at the neutral rotation position P10 with respect to the first case 10. The reference plane 92 (e.g., the first reference plane 22D) is disposed at a position that can be viewed from the center opening 11 in the state where the first surface 71B of the movable member 71 coincides with the reference plane 92 (e.g., the first reference plane 22D) in the axial direction D1.

Note that the indicator 90 is not limited to the mark 91 or the reference plane 92. The indicator 90 may be only one of the mark 91 and the reference plane 92. The mark 91 may include only one of the line 91A and the graphic 91B. In addition, the mark may be provided on the reference plane. Additionally, the inner surface 22C of the sleeve 22 may be color-coded in a plurality of colors in the axial direction D1, and positions at boundaries of a plurality of color-coded regions may be positions indicated by the indicator 90. In this case, the plurality of color-coded regions may be marks of the indicator 90, and the boundaries of the plurality of color-coded regions may be at least one of a line and a graphic included in the mark.

The features of the rotary connector device 1 will be summarized as follows.

(1) The rotary connector device 1 includes the first case 10, the second case 20, and the stopper structure 70. The first case 10 and the second case 20 are provided relatively rotatable to each other about the rotation axis A1 and define the cable housing space 50 provided to surround the rotation axis A1. The stopper structure 70 restricts the relative rotation of the first case 10 and the second case 20 within the predetermined rotation angle. The stopper structure 70 includes the movable member 71, the movement conversion portion 72, and the stopper 73. The movable member 71 is rotatable about the rotation axis A1 with respect to the first case 10 along with the second case 20. The movable member 71 is movable in the axial direction D1 defined along the rotation axis A1 with respect to the first case 10 and the second case 20. The movement conversion portion 72 converts the relative rotation of the first case 10 and the second case 20 into movement of the movable member 71 with respect to the first case 10 and the second case 20 in the axial direction D1. The stopper 73 is provided on at least one of the first case 10 and the second case 20. The stopper 73 is contactable with the movable member 71.

In the rotary connector device 1, when the first case 10 and the second case 20 relatively rotate, the movement conversion portion 72 moves the movable member 71 in the axial direction D1 with respect to the first case 10 and the second case 20. When the movable member 71 moves in the axial direction D1, the movable member 71 contacts the stopper 73, and the relative rotation of the first case 10 and the second case 20 is restricted. Therefore, the operation of the stopper structure 70 can be stabilized, and disconnection of the electrical cable 60 can be more reliably suppressed.

(2) The movement conversion portion 72 is rotatable about the rotation axis A1 along with the first case 10 with respect to the second case 20 and the movable member 71. This allows the movement conversion portion 72 to move the movable member 71 in the axial direction D1 using the relative rotation of the movement conversion portion 72 and the movable member 71.

(3) The movement conversion portion 72 is provided radially outwardly of the movable member 71. This makes it easy to ensure the space required to provide the movement conversion portion 72.

(4) The first case 10 includes the center opening 11 extending in the axial direction D1. At least one of the movable member 71, the movement conversion portion 72, and the stopper 73 is at least partially provided in the center opening 11. As a result, the center opening 11 can be effectively used as the space required to provide the stopper structure 70, and the increase in size of the rotary connector device 1 accompanied by providing the stopper structure 70 can be suppressed.

(5) The first case 10 includes the inner peripheral portion 12 that at least partially defines the center opening 11. The movement conversion portion 72 is provided on the inner peripheral portion 12 of the first case 10. As a result, the inner peripheral portion 12 of the first case 10 can be effectively used as a portion where the movement conversion portion 72 is disposed, and the increase in size of the rotary connector device 1 accompanied by providing the stopper structure 70 can be more reliably suppressed.

(6) The movement conversion portion 72 includes the conversion groove 72A that converts the relative rotation of the first case 10 and the second case 20 into the movement of the movable member 71 in the axial direction D1. The movable member 71 includes the outer peripheral portion 71A disposed in the conversion groove 72A. This makes it possible to simplify the structure of the movement conversion portion 72 by using the conversion groove 72A.

(7) The conversion groove 72A extends in the circumferential direction D3 about the rotation axis A1. Accordingly, the structure of the movement conversion portion 72 can be more simplified.

(8) The conversion groove 72A helically extends about the rotation axis A1. Accordingly, the structure of the movement conversion portion 72 can be more simplified.

(9) The first case 10 includes the first case body 14 and the cylindrical portion 15. The first case body 14 has the annular shape and partially defines the cable housing space 50. The cylindrical portion 15 includes the inner peripheral portion 12 extending from the first case body 14 in the axial direction D1. The inner peripheral portion 12 is easily provided on the first case 10 by the cylindrical portion 15.

(10) At least one of the second case 20 and the movable member 71 includes the at least one guide opening 74. The at least one of the second case 20 and the movable member 71 includes the at least one guide protruding portion 75 that extends in the axial direction D1 and is provided in the at least one guide opening 74. As a result, the configuration in which the second case 20 and the movable member 71 are relatively movable in the axial direction D1 and integrally rotatable about the rotation axis A1 can be achieved by the simple structure.

(11) The at least one guide opening 74 includes the plurality of guide openings 74 disposed spaced apart in the circumferential direction D3 about the rotation axis A1. The at least one guide protruding portion 75 includes the respective plurality of guide protruding portions 75 disposed spaced apart in the circumferential direction D3 and provided in the plurality of guide openings 74. The plurality of guide openings 74 and the plurality of guide protruding portions 75 can increase the coupling strength between the second case 20 and the movable member 71 in the rotation direction.

(12) The second case 20 includes the second case body 21 and the sleeve 22. The second case body 21 has the annular shape and partially defines the cable housing space 50. The sleeve 22 is a separate member from the second case body 21 and is coupled to the second case body 21. The movable member 71 is coupled to the sleeve 22 to be movable in the axial direction D1. Accordingly, the sleeve 22 can be used as a portion that supports the movable member 71, and simplification of the coupling structure of the second case 20 and the movable member 71 can be achieved.

(13) The sleeve 22 includes the sleeve body 22A and the at least one guide protruding portion 75. The guide protruding portion 75 protrudes from the sleeve body 22A in the axial direction D1. The movable member 71 includes the at least one guide opening 74. Accordingly, the simplification of the coupling structure of the second case 20 and the movable member 71 can be more reliably achieved.

(14) The predetermined rotation angle of the stopper structure 70 is defined between the first relative rotation position P11 and the second relative rotation position P12. In a state where the movable member 71 contacts the stopper 73, the first case 10 and the second case 20 are disposed at the first relative rotation position P11. The relative rotation of the first case 10 and the second case 20 can be stopped at the first relative rotation position P11 by the movable member 71 and the stopper 73.

(15) The rotary connector device 1 further includes the electrical cable 60 provided in the cable housing space 50. The first case 10 includes the inner peripheral surface 10B that partially defines the cable housing space 50. The second case 20 includes the outer peripheral surface 20B provided radially inwardly of the inner peripheral surface 10B and partially defines the cable housing space 50. The electrical cable 60 includes the first winding portion 60A, the second winding portion 60B, and the reversing portion 60C. The first winding portion 60A is wound along the inner peripheral surface 10B of the first case 10. The second winding portion 60B is wound along the outer peripheral surface 20B of the second case 20. The reversing portion 60C is provided between the first winding portion 60A and the second winding portion 60B to couple the first winding portion 60A to the second winding portion 60B. Each of the plurality of flat cables 61 includes the first winding portion 60A, the second winding portion 60B, and the reversing portion 60C. The electrical cable 60 is provided in the cable housing space 50 such that the length of the second winding portion 60B of the electrical cable 60 wound about the outer peripheral surface 20B decreases when the second case 20 rotates in the first rotation direction D21 with respect to the first case 10. The electrical cable 60 is provided in the cable housing space 50 such that the length of the second winding portion 60B of the electrical cable 60 wound about the outer peripheral surface 20B increases when the second case 20 rotates in the second rotation direction D22 opposite to the first rotation direction D21 with respect to the first case 10. When the second case 20 rotates in one of the first rotation direction D21 and the second rotation direction D22 with respect to the first case 10, the movement conversion portion 72 moves the movable member 71 in the first moving direction D41 toward the stopper 73. The movement conversion portion 72 moves the movable member 71 in the second moving direction D42 opposite to the first moving direction D41 when the second case 20 rotates in the other of the first rotation direction D21 and the second rotation direction D22 with respect to the first case 10. Thus, the relative rotation of the first case 10 and the second case 20 can be stopped at the first relative rotation position P11 by the movable member 71 and the stopper 73 when the second case 20 rotates with respect to the first case 10 in the first rotation direction D21 in which the electrical cable 60 comes loose. Thus, it can be suppressed that the electrical cable 60 excessively loosens.

(16) The stopper 73 includes the stopper surface 73A facing the axial direction D1. By stopping the movable member 71 by the stopper surface 73A, the relative rotation of the first case 10 and the second case 20 can be stopped.

(17) The stopper surface 73A extends in the circumferential direction D3 with respect to the rotation axis A1. Accordingly, the topper surface 73A which is wider can be ensured, and the strength of the stopper structure 70 is easily ensured.

(18) The movement conversion portion 72 converts the relative rotation of the first case 10 and the second case 20 into the movement of the movable member 71 in the axial direction D1 such that the movement distance of the movable member 71 in the axial direction D1 with respect to the first case 10 and the second case 20 is proportional to the relative rotation angle of the first case 10 and the second case 20. Thus, the design of each unit based on the predetermined rotation angle set in the stopper structure 70 is facilitated.

(19) As illustrated in FIG. 7, when the rotary connector device 1 includes the biasing member 80 that biases the movable member 71 in the axial direction D1, an abnormal noise can be suppressed by the biasing member 80.

(20) The rotary connector device 1 includes the first case 10, the second case 20, the movable member 71, the movement conversion portion 72, and the indicator 90. The first case 10 and the second case 20 are provided relatively rotatable to each other about the rotation axis A1 and define the cable housing space 50 provided to surround the rotation axis A1. The movable member 71 is rotatable about the rotation axis A1 with respect to the first case 10 along with the second case 20 and movable in the axial direction D1 defined along the rotation axis A1 with respect to the first case 10 and the second case 20. The movement conversion portion 72 converts the relative rotation of the first case 10 and the second case 20 into movement of the movable member 71 with respect to the first case 10 and the second case 20 in the axial direction D1. The indicator 90 is provided on at least one of the first case 10 and the second case 20. The indicator 90 indicates that the second case 20 is disposed at the neutral rotation position P10 with respect to the first case 10 by the positional relationship between the movable member 71 and the indicator 90 in the axial direction D1.

In the rotary connector device 1, by viewing the positional relationship between the movable member 71 and the indicator 90, it is possible to reliably determine whether the second case 20 is disposed at the neutral rotation position P10 with respect to the first case 10.

(21) In a state where the movable member 71 is disposed at the position indicated by the indicator 90, the second case 20 is disposed at the neutral rotation position P10 with respect to the first case 10. Accordingly, the neutral rotation position P10 of the rotary connector device 1 is easily viewed by the movable member 71 and the indicator 90.

Note that, although the position of the movable member 71 preferably coincides with the position indicated by the indicator 90 in a state where the second case 20 is disposed at the neutral rotation position P10, the position of the movable member 71 may be displaced from the position indicated by the indicator 90 at the neutral rotation position P10, as long as the neutral rotation position P10 can be determined by the movable member 71 and the indicator 90.

(22) The movable member 71 includes the first surface 71B facing the axial direction D1, and the second surface 71C provided on the back side of the first surface 71B in the axial direction D1. The indicator 90 indicates that the second case 20 is disposed at the neutral rotation position P10 with respect to the first case 10 by the positional relationship between the first surface of the movable member 71 and the indicator 90. Accordingly, by viewing the positional relationship between the first surface 71B of the movable member 71 and the indicator 90, it is possible to more reliably determine whether the second case 20 is disposed at the neutral rotation position P10 with respect to the first case 10.

Note that, instead of the first surface 71B or in addition to the first surface 71B, the second surface 71C of the movable member 71 may be used to determine the neutral rotation position P10. Additionally, another portion of the movable member 71 may be used to determine the neutral rotation position P10.

(23) In a state where the first surface 71B of the movable member 71 is disposed at the position indicated by the indicator 90, the second case 20 is disposed at the neutral rotation position P10 with respect to the first case 10. Thus, the neutral rotation position P10 of the rotary connector device 1 is further easily viewed by the first surface 71B of the movable member 71 and the indicator 90.

Note that, although the position of the first surface 71B of the movable member 71 preferably coincides with the position indicated by the indicator 90 in a state where the second case 20 is disposed at the neutral rotation position P10, the position of the first surface 71B of the movable member 71 may be displaced from the position indicated by the indicator 90 at the neutral rotation position P10, as long as the neutral rotation position P10 can be determined by the first surface 71B of the movable member 71 and the indicator 90.

(24) The second case 20 is rotatable from the neutral rotation position P10 with respect to the first case 10 in the first rotation direction D21 by the first rotation angle, and is rotatable in the second rotation direction D22, which is the direction opposite to the first rotation direction D21, by the second rotation angle. The first rotation angle is substantially equal to the second rotation angle. Accordingly, the neutral rotation position P10 of the rotary connector device 1 can be more reliably provided at the center of the entire rotation angle of the second case 20.

Note that the first rotation angle may be different from the second rotation angle. That is, the neutral rotation position P10 may be displaced from the center of the entire rotation angle of the second case 20.

(25) The second case 20 includes the second case body 21 and the sleeve 22. The second case body 21 has the annular shape and partially defines the cable housing space 50. The sleeve 22 is a separate member from the second case body 21 and is coupled to the second case body 21. The movable member 71 is coupled to the sleeve 22 to be movable in the axial direction D1. The indicator 90 is provided on the sleeve 22. Accordingly, the indicator 90 can be disposed at the easily viewed position.

Note that the indicator 90 may be provided on a member other than the sleeve 22 instead of being provided on the sleeve 22 or in addition to being provided on the sleeve 22. Additionally, the indicator 90 may be provided only on the first case 10 or both the first case 10 and the second case 20.

(26) The indicator 90 includes at least one of the mark 91 and the reference plane 92 provided on the sleeve 22. Accordingly, the configuration of the indicator 90 can be simplified.

Note that the indicator 90 may include only one of the mark 91 and the reference plane 92 or may include a configuration other than the mark 91 or the reference plane 92.

(27) The sleeve 22 includes the inner surface 22C facing radially inward. At least a part of the indicator 90 is provided on the inner surface 22C of the sleeve 22. Thus, the indicator 90 can be disposed at the more easily viewed position.

Note that the indicator 90 may be provided in a portion other than the inner surface 22C of the sleeve 22.

(28) The mark 91 of the indicator 90 is provided on the inner surface 22C of the sleeve 22. Thus, the mark 91 can be disposed at the more easily viewed position.

Note that the mark 91 may be provided in a portion other than the inner surface 22C of the sleeve 22.

(29) The reference plane 92 of the indicator 90 includes the first reference plane 22D provided on the sleeve 22 and substantially perpendicular to the axial direction D1. Thus, the reference plane 92 can be disposed at the more easily viewed position.

Note that the reference plane 92 may be provided on a portion other than the inner surface 22C of the sleeve 22.

(30) In the state where the first surface 71B of the movable member 71 coincides with the reference plane 92 in the axial direction D1, the second case 20 is disposed at the neutral rotation position P10 with respect to the first case 10. Thus, the neutral rotation position P10 of the rotary connector device 1 is further easily viewed using the first surface 71B of the movable member 71 and the reference plane 92.

(31) The indicator 90 is disposed radially inwardly of the movement conversion portion 72. Accordingly, the space provided radially inwardly of the movement conversion portion 72 can be used as a space for the indicator 90.

Note that the indicator 90 may be provided in a space other than the space radially inwardly of the movement conversion portion 72.

(32) The first case 10 includes the center opening 11 extending in the axial direction D1. At least one of the movable member 71, the movement conversion portion 72, and the indicator 90 is at least partially provided in the center opening 11. Therefore, the center opening 11 can be effectively used as the space required to provide at least one of the movable member 71, the movement conversion portion 72, and the indicator 90.

Note that at least one of the movable member 71, the movement conversion portion 72, and the indicator 90 may be disposed at least partially outside the center opening 11.

(33) The first case 10 is a stator to be secured to the vehicle body. The second case 20 is a rotor rotatable about the rotation axis A1 with respect to the stator 10. The stopper 73 is provided at least on the stator 10. As a result, an overload can be received by the stator 10 when the movable member 71 contacts the stopper 73, and thus the strength of the stopper structure 70 can be increased.

Note that the movement conversion portion 72 may include another structure instead of the conversion groove 72A or in addition to the conversion groove 72A.

Figure 11:
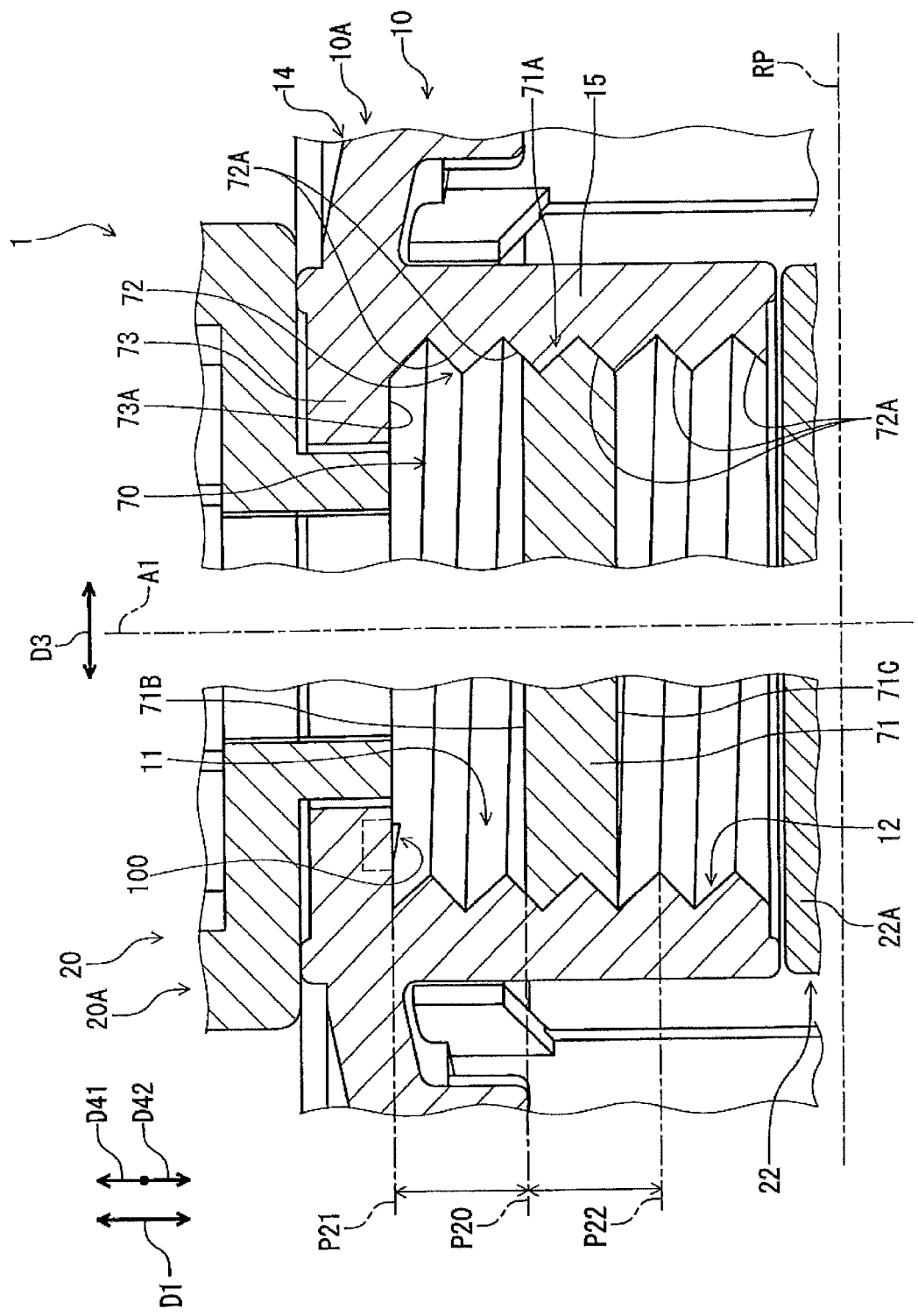
FIG. 11 is a partial cross-sectional view of a rotary connector device according to a modification.

As illustrated in FIG. 11, the rotary connector device 1 may include a detection unit 100. The detection unit 100 detects such that the second case 20 is disposed at the first relative rotation position P11 with respect to the first case 10. The detection unit 100 is provided on at least one of the first case 10 and the second case 20. In the modification illustrated in FIG. 11, the detection unit 100 is provided on the first case 10. The detection unit 100 detects that the movable member 71 is disposed at the first stopper position P21 with respect to the first case 10. The detection unit 100 is provided on the stopper surface 73A. The detection unit 100 generates an electrical signal in a state where the second case 20 is disposed at the first relative rotation position P11 with respect to the first case 10. In the modification illustrated in FIG. 11, for example, the detection unit 100 includes a push button switch. Examples of the detection unit 100 include, for example, a contact type sensor (push button switch, touch sensor) and a non-contact type sensor (magnetic sensor, optical sensor). The detection unit 100 is electrically connected to, for example, a transmission unit that transmits an electrical signal, a notification unit that notifies a user of a detection result, and a battery.

Note that the detection unit 100 may be provided on the sleeve 22 or the movable member 71, or another detection unit may be provided on the sleeve 22 or the movable member 71 in addition to the detection unit 100. The detection unit provided in the sleeve 22 detects, for example, such that the second case 20 is disposed at the second relative rotation position P12 with respect to the first case 10.

In the above-described embodiment, as illustrated in FIG. 3, the movement conversion portion 72 is rotatable about the rotation axis A1 along with the first case 10 with respect to the second case 20 and the movable member 71. However, the rotary connector device 1 may have the structure illustrated in FIG. 12 to FIG. 14.

Figure 12:
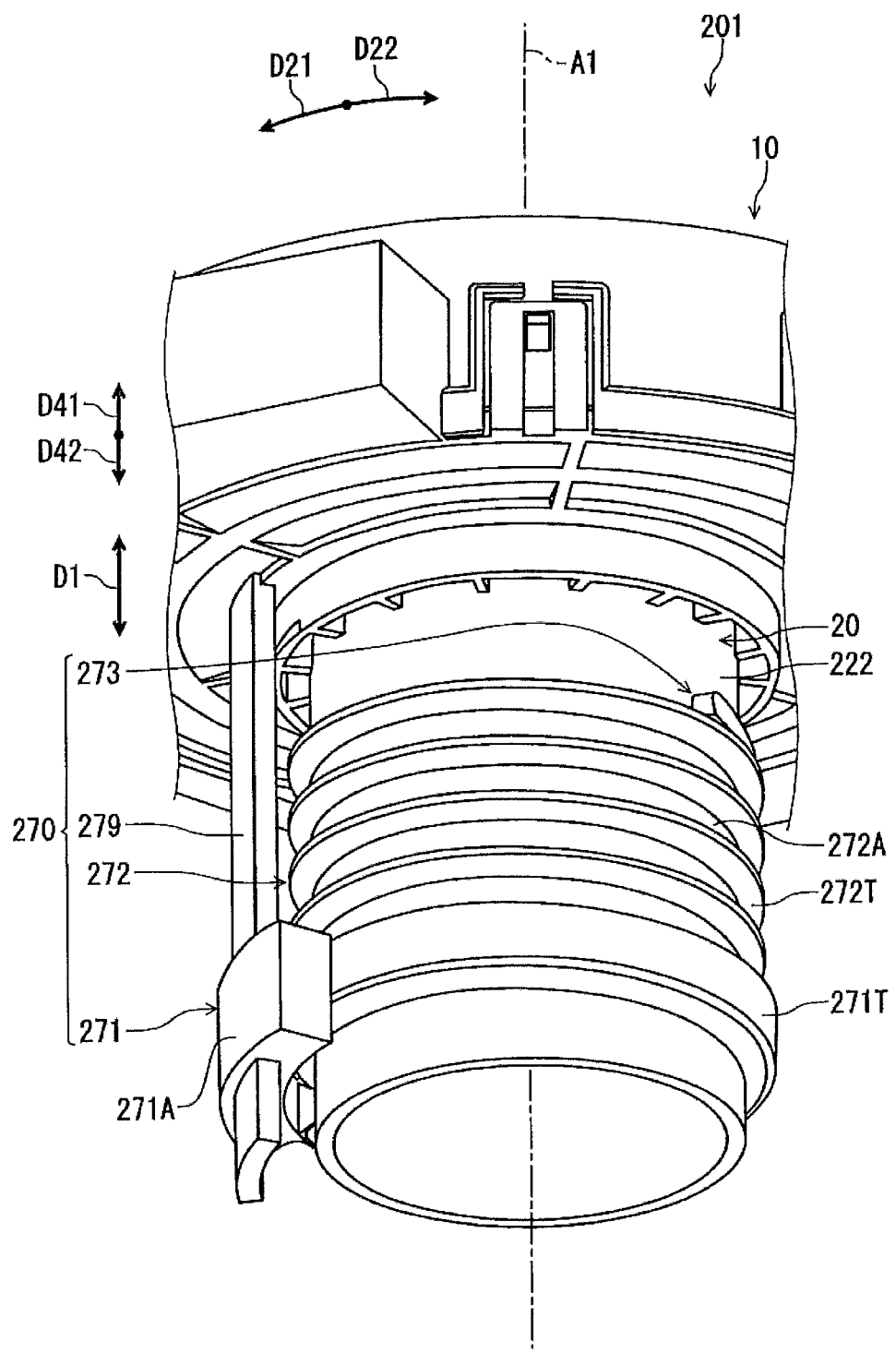
FIG. 12 is a perspective view of a rotary connector device according to the modification.

As illustrated in FIG. 12, specifically, a rotary connector device 201 according to a modification includes a stopper structure 270. The stopper structure 270 includes a movable member 271, a movement conversion portion 272, and a stopper 273. The movable member 271 is rotatable about the rotation axis A1 along with the second case 20 with respect to the first case 10. The movable member 271 is movable with respect to the first case 10 and the second case 20 in the axial direction D1 defined along the rotation axis A1. The movement conversion portion 272 converts the relative rotation of the first case 10 and the second case 20 into movement of the movable member 271 with respect to the first case 10 and the second case 20 in the axial direction D1. The stopper 273 is provided on at least one of the first case 10 and the second case 20. The stopper 273 is contactable with the movable member 271. In the present modification, the stopper 273 is provided on the second case 20. However, the stopper 273 may be provided on the first case 10 or both the first case 10 and the second case 20.

The movement conversion portion 272 is rotatable about the rotation axis A1 along with the second case 20 with respect to the first case 10. The second case 20 of the rotary connector device 201 includes a sleeve 222. The sleeve 222 has substantially the same structure as the sleeve 22 of the first embodiment. The length of the sleeve 222 defined in the axial direction D1 is longer than the length of the sleeve 22 defined in the axial direction D1. The movement conversion portion 272 is provided on the sleeve 222. The movement conversion portion 272 is provided on the outer peripheral surface of the sleeve 222. The movement conversion portion 272 includes a conversion groove 272A that extends helically along the outer peripheral surface of the sleeve 222. In more detail, the movement conversion portion 272 includes a male thread 272T that extends helically along the outer peripheral surface of the sleeve 222. The male thread 272T defines the conversion groove 272A.

The movable member 271 is movable in the axial direction D1 with respect to the first case 10 and the second case 20. The movable member 271 includes a movable body 271A and a female thread 271T. The movable body 271A is movably coupled to the first case 10 in the axial direction D1. For example, the stopper structure 270 includes a guide 279. The guide 279 is secured to the first case 10 and extends from the first case 10 in the axial direction D1. The movable body 271A is attached to the guide 279 to be movable in the axial direction D1 with respect to the guide 279. The guide 279 restricts the rotation of the movable body 271A with respect to the first case 10.

The female thread 271T is secured to the movable body 271A and is movable in the axial direction D1 with respect to the first case 10 and the second case 20 along with the movable body 271A. The female thread 271T extends helically along the outer peripheral surface of the sleeve 222. The female thread 271T engages the male thread 272T of the movement conversion portion 272. The female thread 271T is movably disposed in the conversion groove 272A of the movement conversion portion 272.

Figure 13:
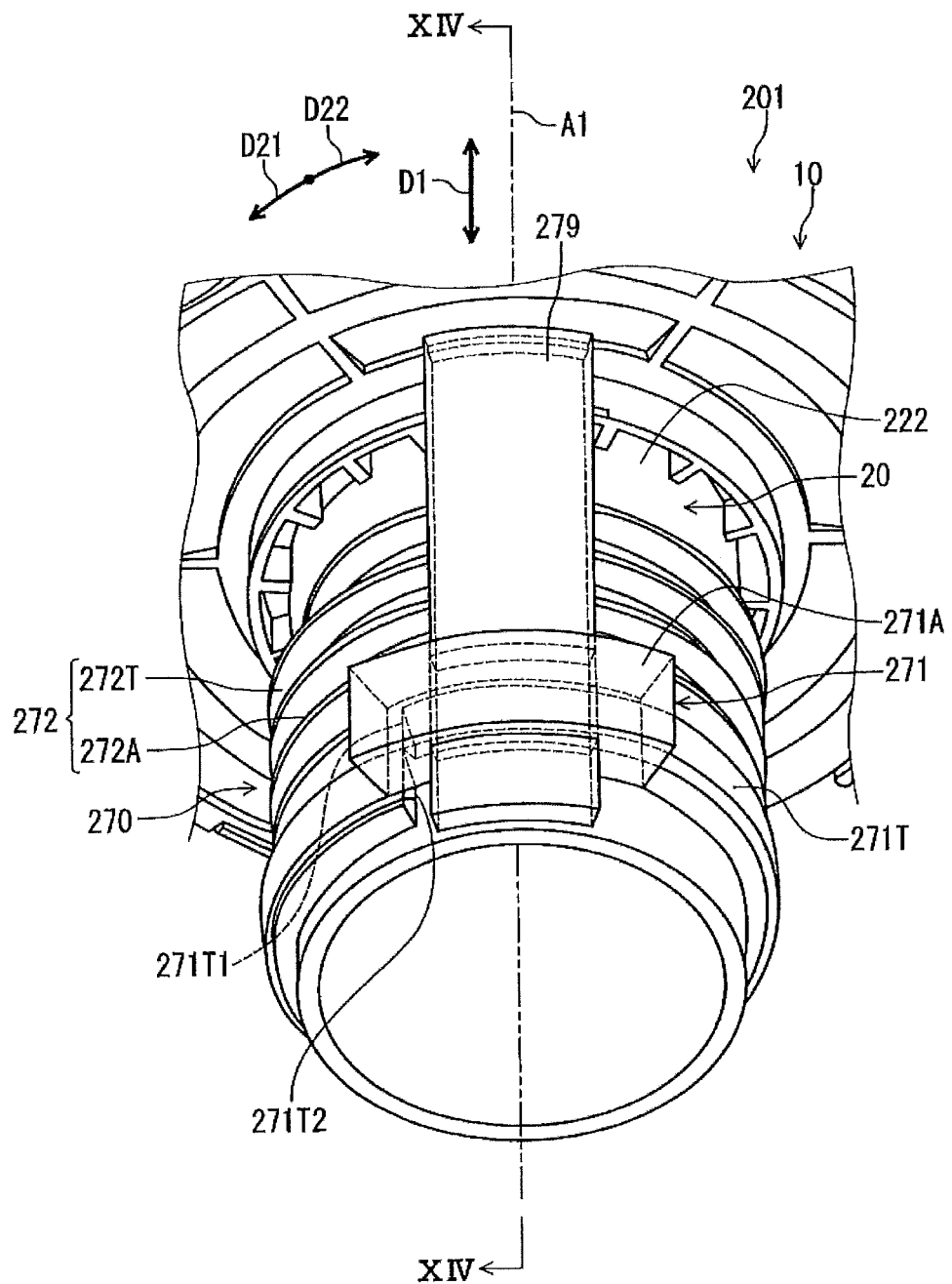
FIG. 13 is another perspective view of the rotary connector device according to the modification.

As illustrated in FIG. 13, the female thread 271T includes a first end portion 271T1 and a second end portion 271T2. The female thread 271T extends helically along the outer peripheral surface of the sleeve 222 between the first end portion 271T1 and the second end portion 271T2. The first end portion 271T1 and the second end portion 271T2 are disposed spaced apart and secured to the movable body 271A.

Figure 14:
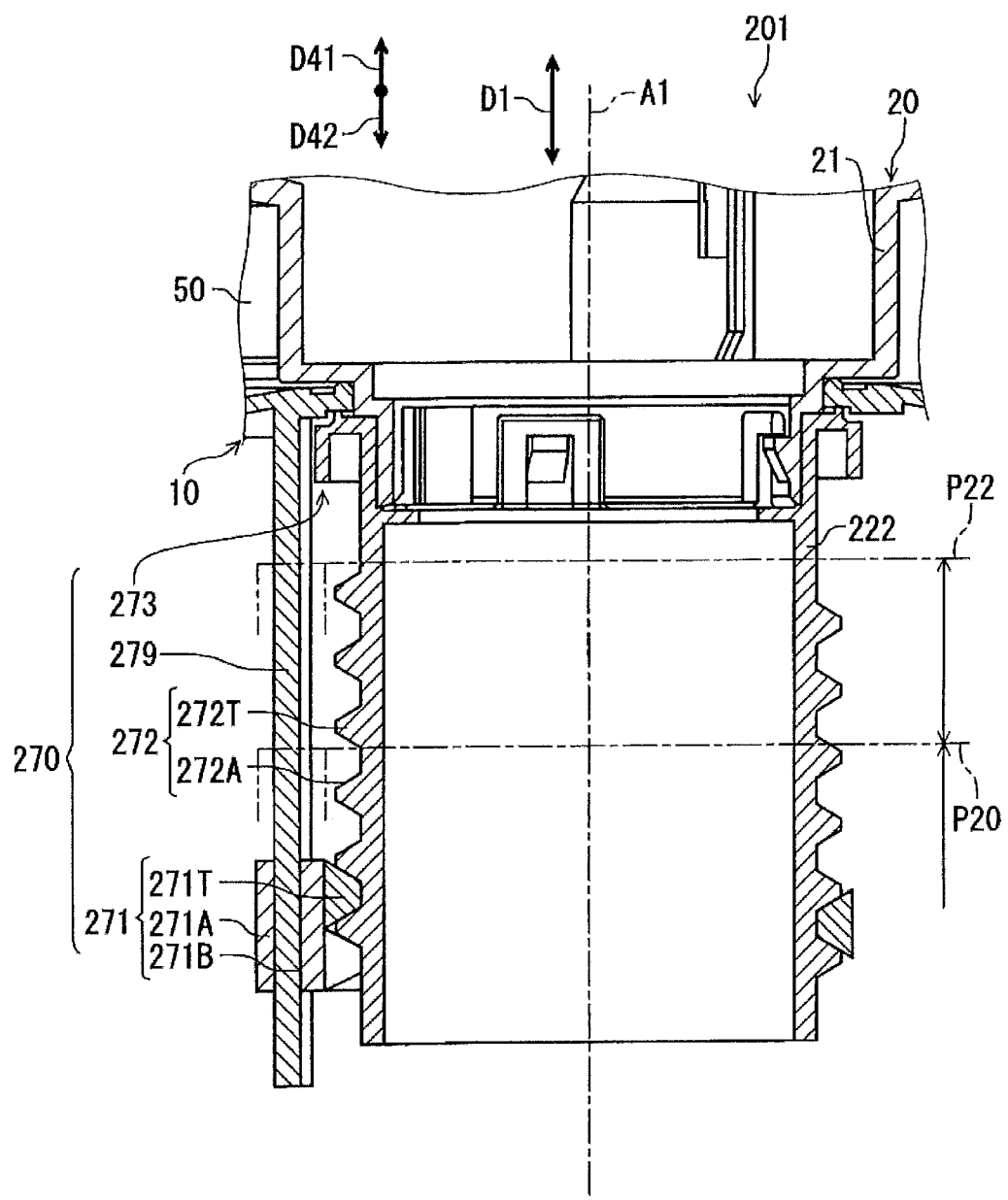
FIG. 14 is a cross-sectional view of the rotary connector device taken along line XIV-XIV of FIG. 13.

As illustrated in FIG. 14, the movable body 271A includes a hole 271B. The guide 279 extends in the axial direction D1 through the hole 271B.

Figure 15:
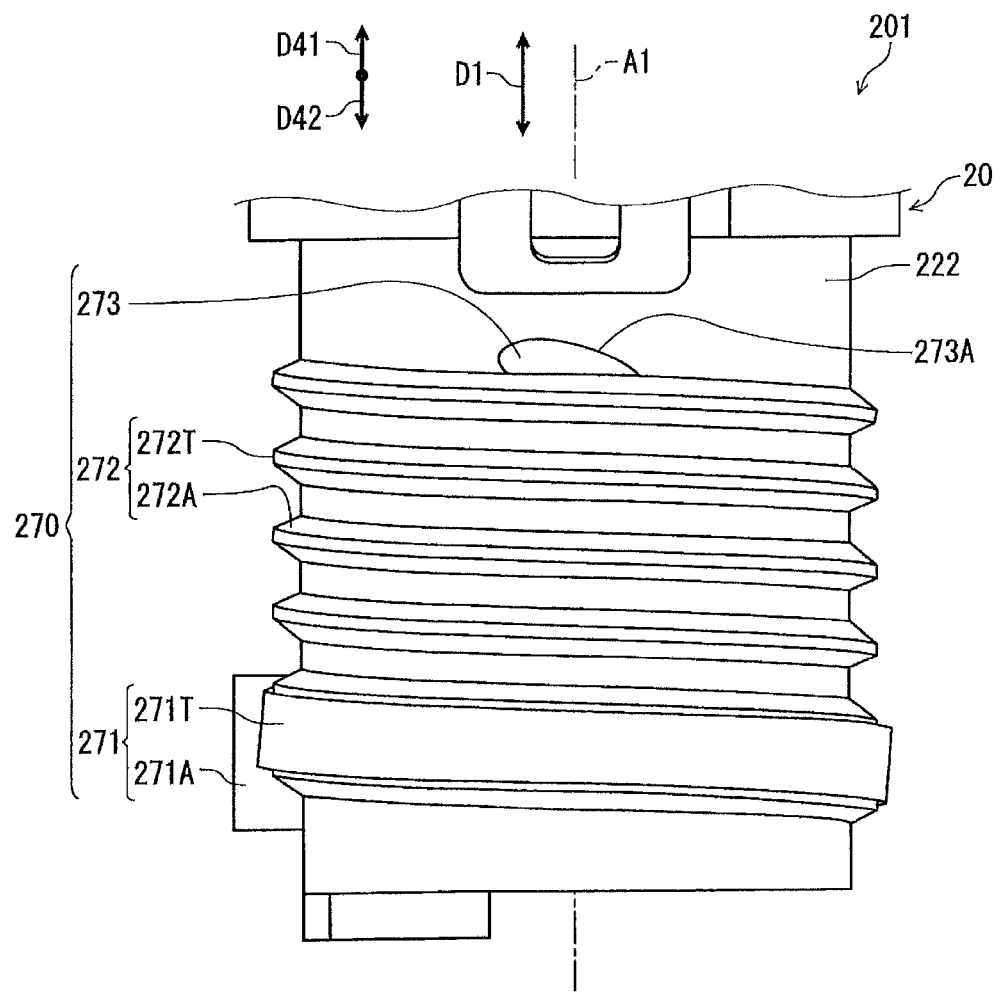
FIG. 15 is a partial side view of a rotary connector device according to a modification.

As illustrated in FIG. 15, the stopper 273 is provided on the outer peripheral surface of the sleeve 222 of the second case 20. The stopper 273 is contactable with the female thread 271T. The stopper 273 is contactable with the first end portion 271T1 of the female thread 271T.

The stopper 273 includes a contact surface 273A. The contact surface 273A is contactable with the first end portion 271T1 of the female thread 271T of the movable member 271. The contact surface 273A is inclined with respect to the circumferential direction of the sleeve 222. The contact surface 273A is curved when viewed from the radial direction of the sleeve 222. When the first end portion 271T1 of the female thread 271T of the movable member 271 contacts the contact surface 273A of the stopper 273, the rotation of the second case 20 with respect to the first case 10 stops.

However, since the contact surface 273A is inclined, when the rotational force given to the second case 20 exceeds a predetermined level, the first end portion 271T1 of the female thread 271T climbs over the contact surface 273A. Thus, after the first end portion 271T1 of the female thread 271T contacts the contact surface 273A of the stopper 273, when the rotational force exceeding the predetermined level is given to the second case 20, the rotation of the second case 20 in the second rotation direction D22 is permitted.

As illustrated in FIG. 12, when the second case 20 rotates in one of the first rotation direction D21 and the second rotation direction D22 with respect to the first case 10, the movement conversion portion 272 moves the movable member 271 toward the stopper 273 in the first moving direction D41. In the present modification, when the second case 20 rotates in the second rotation direction D22 with respect to the first case 10, the movement conversion portion 272 moves the movable member 271 toward the stopper 273 in the first moving direction D41. The movement conversion portion 272 moves the movable member 271 in the second moving direction D42 when the second case 20 rotates in the first rotation direction D21 with respect to the first case 10. However, the movement conversion portion 272 may be configured to move the movable member 271 in the second moving direction D42 when the second case 20 rotates in the second rotation direction D22 with respect to the first case 10. The movement conversion portion 272 may be configured to move the movable member 271 in the first moving direction D41 when the second case 20 rotates in the first rotation direction D21 with respect to the first case 10.

Figure 16:
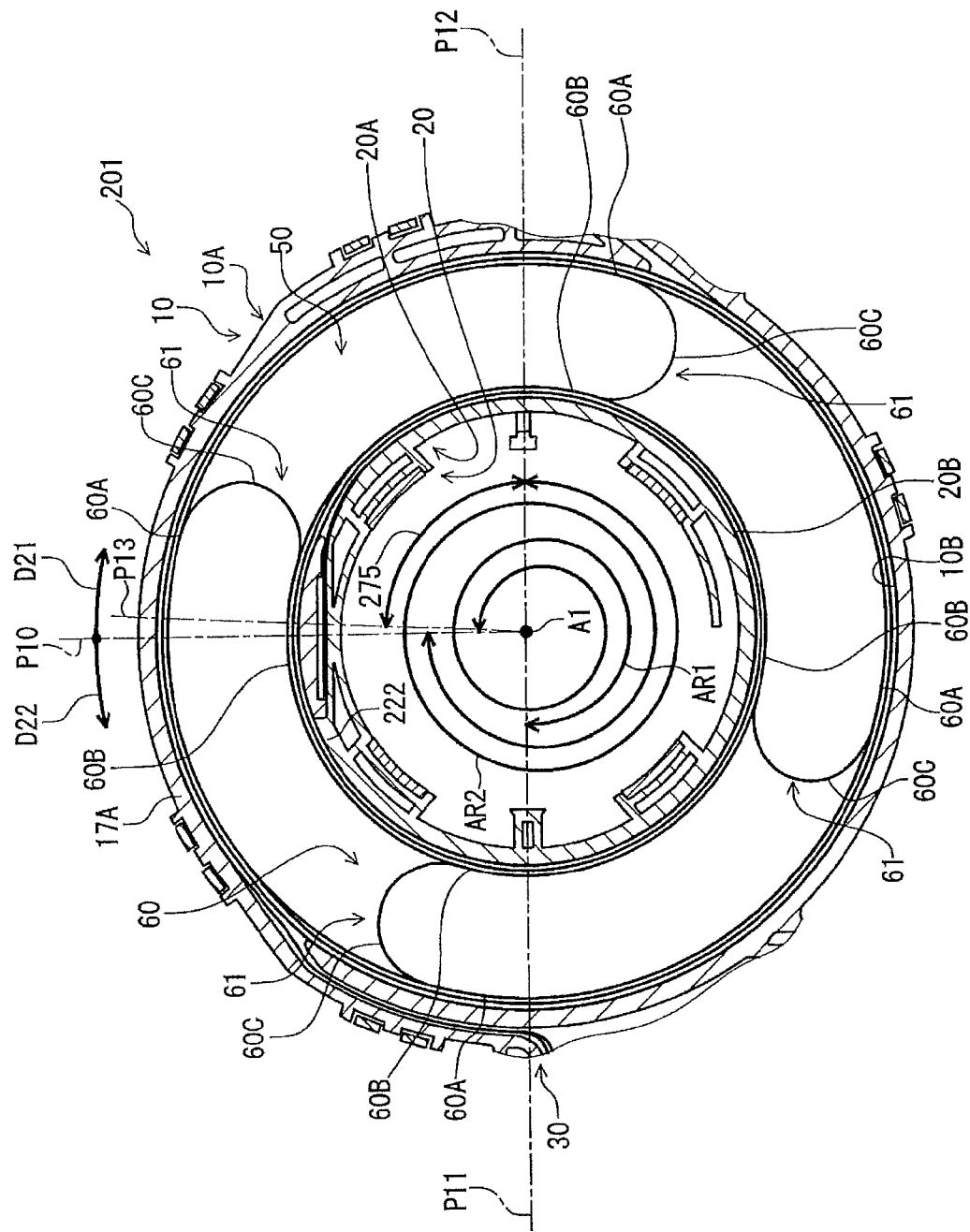
FIG. 16 is a cross-sectional view of a rotary connector device according to the modification.

In the present modification, when the movable member 271 contacts the stopper 273, the second case 20 stops at the second relative rotation position P12 (see FIG. 16). Specifically, when the first end portion 271T1 of the female thread 271T of the movable member 271 contacts the contact surface 273A of the stopper 273, the second case 20 stops at the second relative rotation position P12 (see FIG. 2). However, the stopper structure 270 may be configured to stop the second case 20 at the first relative rotation position P11 (see FIG. 16) when the movable member 271 contacts the stopper 273.

As illustrated in FIG. 16, the stopper structure 270 includes an idle region 275. The idle region 275 is defined between the second relative rotation position P12 and a third relative rotation position P13. The third relative rotation position P13 is the position of the second case 20 in which the second case 20 is further rotated from the second relative rotation position P12 in the second rotation direction D22 with respect to the first case 10. In a state where the second case 20 is disposed at the third relative rotation position P13, bending of the reversing portion 60C of the electrical cable 60 is eliminated, and the reversing portion 60C is pulled between the first case 10 and the second case 20. Thus, the rotation of the second case 20 at the second rotation direction D22 with respect to the first case 10 stops at the third relative rotation position P13. In the idle region 275, the movement conversion portion 272 does not substantially guide the movable member 271 in the first moving direction D41. Thus, in the idle region 275, the rotation of the second case 20 is not restricted by the stopper 273. On the other hand, in a state where the reversing portion 60C of the electrical cable 60 is pulled (e.g., in a state where the second case 20 stops at the third relative rotation position P13), when the rotational force in the second rotation direction D22 given to the steering exceeds the predetermined level, the electrical cable 60 is disconnected. In this case, the operation by steering is performed beyond the third relative rotation position P13, and thus safety in the vehicle operation can be ensured.

In the rotary connector device 201, when the rotation of the second case 20 reaches the second relative rotation position P12, the movable member 271 contacts the stopper 273, and thus a driver feels that the rotation of steering is heavy. That is, the driver can recognize the termination of steering by the stopper 273.

Generally, there is a possibility that the rotary connector device 201 is attached to the vehicle body in a state where the position of the movable member 271 is displaced from the neutral position P20 (FIG. 14) with the steering at the neutral position. For example, when the movable member 271 is displaced from the neutral position P20 toward the second stopper position P22, the rotational range of the second case 20 in the second rotation direction D22 narrows.

However, in the rotary connector device 201, when the movable member 271 contacts the stopper 273 and then a rotational force exceeding the predetermined level is given to the second case 20, the rotation of the second case 20 in the second rotation direction D22 is permitted. Therefore, even when the position of the movable member 271 is displaced from the neutral position P20 with the steering at the neutral position, narrowing the rotational range of the steering can be suppressed.

Note that the orientations of the threads of the male thread 272T and the female thread 271T may be reversed. In a case where the orientations of the threads of the male thread 272T and the female thread 271T are reversed, when the second case 20 rotates in the first rotation direction D21 with respect to the first case 10, the movable member 271 moves in the first moving direction D41. When the second case 20 rotates in the second rotation direction D22 with respect to the first case 10, the movable member 271 moves in the second moving direction D42. When the movable member 271 contacts the stopper 273, for example, the second case 20 stops at the first relative rotation position P11 (see FIG. 16). The idle region 275 is defined in the first rotation direction D21 from the first relative rotation position P11.

Additionally, the idle region 275 may be omitted from the stopper structure 270. In this case, the contact surface 273A of the stopper 273 has, for example, a shape (e.g., a plane facing the circumferential direction) with which the female thread 271T of the movable member 271 does not climb over.

As illustrated in FIG. 14, in the present modification, the male thread 272T of the movement conversion portion 272 is provided integrally with at least a portion of the sleeve 222 as a one-piece member. The female thread 271T is a separate member from the movable body 271A. The guide 279 is provided integrally with at least a portion of the first case 10 as a one-piece member. However, the male thread 272T of the movement conversion portion 272 may be a separate member from the sleeve 222. The female thread 271T may be provided integrally with at least a portion of the movable body 271A as a one-piece member. The guide 279 may be a separate member from the first case 10.

Additionally, the indicator 90 described above may be provided on the guide 279 illustrated in FIG. 13. In this case, the indicator 90 indicates that the second case 20 is disposed at the neutral rotation position P10 (see FIG. 16) with respect to the first case 10 by the positional relationship between the movable member 271 and the indicator 90 in the axial direction D1.

In the present application, the term "comprise" and its derivatives are open-ended terms for explaining the existence of a component, and the existence of other components not described is not excluded. This also applies to "have", "include" and their derivatives.

In the present application, ordinal numbers such as "first" and "second" are merely terms used to identify a configuration and do not have any other meaning (e.g., a specific order). For example, the presence of "first element" does not imply the presence of "second element", and the presence of "second element" does not imply the presence of the "first element".

Expressions such as "parallel", "orthogonal", and "identical" in the present disclosure should not be interpreted strictly and include respectively the meanings of "substantially parallel", "substantially orthogonal", and "substantially identical". In addition, other expressions related to the arrangement are not strictly construed.

The expression "at least one of A and B" in the present disclosure also includes, for example, all of (1) only A, (2) only B, and (3) both A and B. The expression "at least one of A, B and C" includes, for example, all of (1) only A, (2) only B, (3) only C, (4) A and B, (5) B and C, (6) A and C, and (7) A, B and C. In the present disclosure, the expression "at least one of A and B" is not construed as "at least one of A and at least one of B".

It is apparent from the above disclosure that various changes and modifications of the disclosure are possible. Accordingly, the disclosure may be implemented in a manner different from the specific disclosure of the present application without departing from the spirit of the disclosure.

What is claimed is:

1. A rotary connector device comprising:
   a first case;
   a second case, the first case and the second case being rotatably provided relative to each other about a rotation axis, the first case and the second case defining a cable housing space provided to surround the rotation axis;
   a stopper structure to restrict a relative rotation of the first case and the second case within a predetermined rotation angle; and
   the stopper structure comprising:
      a movable member rotatable about the rotation axis along with the second case with respect to the first case, the movable member being movable in an axial direction defined along the rotation axis with respect to the first case and the second case;
      a movement conversion portion to convert the relative rotation of the first case and the second case into a movement of the movable member in the axial direction with respect to the first case and the second case; and
      a stopper provided on at least one of the first case and the second case, the stopper being contactable with the movable member.

2. The rotary connector device according to claim 1, wherein
the movement conversion portion is rotatable about the rotation axis along with the first case with respect to the second case and the movable member, and
the movement conversion portion is provided radially outwardly of the movable member.

3. The rotary connector device according to claim 1, wherein
the movement conversion portion is configured to convert the relative rotation of the first case and the second case into the movement of the movable member in the axial direction such that a movement distance of the movable member in the axial direction with respect to the first case and the second case is proportional to a relative rotation angle of the first case and the second case.

4. The rotary connector device according to claim 1, further comprising
a biasing member biasing the movable member in the axial direction.

5. The rotary connector device according to claim 1, wherein
the movement conversion portion is rotatable about the rotation axis along with the second case with respect to the first case.

6. The rotary connector device according to claim 1, wherein
the first case includes a stator to be secured to a vehicle body,
the second case includes a rotor rotatable about the rotation axis with respect to the stator, and
the stopper is provided at least to the stator.

7. The rotary connector device according to claim 1, wherein
the predetermined rotation angle of the stopper structure is defined between a first relative rotation position and a second relative rotation position, and
the first case and the second case are disposed at the first relative rotation position in a state where the movable member contacts the stopper.

8. The rotary connector device according to claim 7, further comprising
an electrical cable provided in the cable housing space, wherein
the first case includes an inner peripheral surface partially defining the cable housing space,
the second case includes an outer peripheral surface provided radially inwardly of the inner peripheral surface and partially defining the cable housing space,
the electrical cable includes a first winding portion, a second winding portion, and a reversing portion, the first winding portion being wound along the inner peripheral surface of the first case, the second winding portion being wound along the outer peripheral surface of the second case, the reversing portion being provided between the first winding portion and the second winding portion and coupling the first winding portion to the second winding portion,
the electrical cable is provided in the cable housing space such that a length of the second winding portion of the electrical cable wound about the outer peripheral surface decreases when the second case rotates in a first rotation direction with respect to the first case,
the electrical cable is provided in the cable housing space such that the length of the second winding portion of the electrical cable wound about the outer peripheral surface increases when the second case rotates with respect to the first case in a second rotation direction opposite to the first rotation direction,
the movement conversion portion is configured to move the movable member in a first moving direction toward the stopper when the second case rotates in one of the first rotation direction and the second rotation direction with respect to the first case, and
the movement conversion portion is configured to move the movable member in a second moving direction opposite to the first moving direction when the second case rotates in the other of the first rotation direction and the second rotation direction with respect to the first case.

9. The rotary connector device according to claim 1, wherein
the stopper includes a stopper surface facing in the axial direction.

10. The rotary connector device according to claim 9, wherein
the stopper surface extends in a circumferential direction about the rotation axis.

11. The rotary connector device according to claim 1, wherein
the first case includes a center opening extending in the axial direction,
at least one of the movable member, the movement conversion portion, and the stopper is at least partially provided in the center opening,
the first case includes an inner peripheral portion at least partially defining the center opening, and
the movement conversion portion is provided on the inner peripheral portion of the first case.

12. The rotary connector device according to claim 11, wherein
the first case includes a first case body and a cylindrical portion, the first case body having an annular shape and being configured to partially define the cable housing space, the cylindrical portion including the inner peripheral portion extending from the first case body in the axial direction.

13. The rotary connector device according to claim 11, wherein
the movement conversion portion includes a conversion groove configured to convert the relative rotation of the first case and the second case into the movement of the movable member in the axial direction, and
the movable member includes an outer peripheral portion disposed in the conversion groove.

14. The rotary connector device according to claim 13, wherein
the conversion groove extends in a circumferential direction about the rotation axis, or
the conversion groove helically extends about the rotation axis.

15. The rotary connector device according to claim 1, wherein
at least one of the second case and the movable member includes at least one guide opening, and
at least one of the second case and the movable member includes at least one guide protruding portion extending in the axial direction and provided in the at least one guide opening.

16. The rotary connector device according to claim 15, wherein
the at least one guide opening includes a plurality of guide openings disposed spaced apart in a circumferential direction about the rotation axis, and the at least one guide protruding portion includes a plurality of guide protruding portions disposed spaced apart in the circumferential direction and provided respectively in the plurality of guide openings.

17. The rotary connector device according to claim 15, wherein
the second case comprises a second case body and a sleeve, the second case body having an annular shape and being configured to partially define the cable housing space, the sleeve being a separate member from the second case body and coupled to the second case body, and
the movable member is movably coupled to the sleeve in the axial direction.

18. The rotary connector device according to claim 17, wherein
the sleeve includes a sleeve body and the at least one guide protruding portion, the guide protruding portion protruding from the sleeve body in the axial direction, and
the movable member includes the at least one guide opening.

19. The rotary connector device according to claim 1, further comprising
an indicator provided on at least one of the first case and the second case, wherein
the indicator indicates that the second case is disposed at a neutral rotation position with respect to the first case by a positional relationship between the movable member and the indicator in the axial direction.

20. The rotary connector device according to claim 19, wherein
the second case is disposed at the neutral rotation position with respect to the first case in a state where the movable member is disposed at a position indicated by the indicator.

21. The rotary connector device according to claim 19, wherein
the movable member includes a first surface facing the axial direction and a second surface provided on a back side of the first surface in the axial direction,
the indicator indicates that the second case is disposed at the neutral rotation position with respect to the first case by a positional relationship between the first surface of the movable member and the indicator, and
the second case is disposed at the neutral rotation position with respect to the first case in a state where the first surface of the movable member is disposed at the position indicated by the indicator.

22. The rotary connector device according to claim 19, wherein
the second case is rotatable from the neutral rotation position with respect to the first case in a first rotation direction by a first rotation angle and is rotatable in a second rotation direction by a second rotation angle, and the second rotation direction is a direction opposite to the first rotation direction, and
the first rotation angle is substantially equal to the second rotation angle.

23. The rotary connector device according to claim 19, wherein
the movable member includes a first surface facing the axial direction and a second surface provided on a back side of the first surface in the axial direction, and
the second case is disposed at the neutral rotation position with respect to the first case in a state where the first surface of the movable member coincides with the reference plane in the axial direction.

24. The rotary connector device according to claim 19, wherein
the indicator is disposed radially inwardly of the movement conversion portion.

25. The rotary connector device according to claim 19, wherein
the first case includes a center opening extending in the axial direction, and
at least one of the movable member, the movement conversion portion, or the indicator is at least partially provided in the center opening.

26. The rotary connector device according to claim 19, wherein
the second case includes a second case body and a sleeve, the second case body having an annular shape and being configured to partially define the cable housing space, the sleeve being a separate member from the second case body and coupled to the second case body,
the movable member is coupled to the sleeve to be movable in the axial direction, and
the indicator is provided on the sleeve.

27. The rotary connector device according to claim 26, wherein
the indicator includes at least one of a mark and a reference plane provided on the sleeve.

28. The rotary connector device according to claim 27, wherein
the sleeve includes an inner surface facing radially inward,
the indicator is at least partially provided on the inner surface of the sleeve, and
the mark of the indicator is provided on the inner surface of the sleeve.

29. The rotary connector device according to claim 27, wherein
the reference plane of the indicator includes a first reference plane provided on the sleeve and substantially perpendicular to the axial direction.

* * * * *